(12) United States Patent
Jain et al.

(10) Patent No.: US 11,983,893 B2
(45) Date of Patent: May 14, 2024

(54) SYSTEMS AND METHODS FOR HYBRID DEPTH REGULARIZATION

(71) Applicant: Adeia Imaging LLC, San Jose, CA (US)

(72) Inventors: Ankit Jain, Mountain View, CA (US); Priyam Chatterjee, Sunnyvale, CA (US); Kartik Venkataraman, San Jose, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/153,856

(22) Filed: Jan. 12, 2023

(65) Prior Publication Data

US 2023/0334687 A1   Oct. 19, 2023

Related U.S. Application Data

(63) Continuation of application No. 17/078,732, filed on Oct. 23, 2020, now Pat. No. 11,562,498, which is a
(Continued)

(51) Int. Cl.
*G06T 7/593* (2017.01)
*G06T 5/30* (2006.01)
(Continued)

(52) U.S. Cl.
CPC ............ *G06T 7/593* (2017.01); *G06T 5/30* (2013.01); *G06T 5/50* (2013.01); *G06T 7/11* (2017.01);
(Continued)

(58) Field of Classification Search
CPC ..... G06T 7/11; G06T 7/13; G06T 7/44; G06T 7/136; G06T 7/194; G06T 7/593;
(Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1669332 A | 9/2005 |
| CN | 1839394 A | 9/2006 |

(Continued)

OTHER PUBLICATIONS

Extended European Search Report for EP Application No. 13810429.4, Completed Jan. 7, 2016, dated Jan. 15, 2016, 6 Pgs.
(Continued)

*Primary Examiner* — Daniel G Mariam
(74) *Attorney, Agent, or Firm* — KPPB LLP

(57) ABSTRACT

Systems and methods for hybrid depth regularization in accordance with various embodiments of the invention are disclosed. In one embodiment of the invention, a depth sensing system comprises a plurality of cameras; a processor; and a memory containing an image processing application. The image processing application may direct the processor to obtain image data for a plurality of images from multiple viewpoints, the image data comprising a reference image and at least one alternate view image; generate a raw depth map using a first depth estimation process, and a confidence map; and generate a regularized depth map. The regularized depth map may be generated by computing a secondary depth map using a second different depth estimation process; and computing a composite depth map by selecting depth estimates from the raw depth map and the secondary depth map based on the confidence map.

38 Claims, 25 Drawing Sheets

Related U.S. Application Data continuation of application No. 16/685,881, filed on Nov. 15, 2019, now Pat. No. 10,818,026, which is a continuation of application No. 15/682,295, filed on Aug. 21, 2017, now Pat. No. 10,482,618.

(51) Int. Cl.
  *G06T 5/50* (2006.01)
  *G06T 7/11* (2017.01)
  *G06T 7/13* (2017.01)
  *G06T 7/136* (2017.01)
  *G06T 7/194* (2017.01)
  *G06T 7/44* (2017.01)

(52) U.S. Cl.
  CPC .............. *G06T 7/13* (2017.01); *G06T 7/136* (2017.01); *G06T 7/194* (2017.01); *G06T 7/44* (2017.01); *G06T 2200/04* (2013.01); *G06T 2207/10012* (2013.01); *G06T 2207/10028* (2013.01); *G06T 2207/20028* (2013.01); *G06T 2207/20032* (2013.01); *G06T 2207/20036* (2013.01); *G06T 2207/20192* (2013.01)

(58) Field of Classification Search
  CPC . G06T 2207/10012; G06T 2207/10028; G06T 2207/20028; G06T 2207/20032; G06T 2207/20036; G06T 2207/20192; G06T 5/30; G06T 5/50; G06T 2200/04; H04N 2013/0081
  See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,488,674 A | 1/1996 | Burt et al. |
| 5,629,524 A | 5/1997 | Stettner et al. |
| 5,793,900 A | 8/1998 | Nourbakhsh et al. |
| 5,808,350 A | 9/1998 | Jack et al. |
| 5,832,312 A | 11/1998 | Rieger et al. |
| 5,880,691 A | 3/1999 | Fossum et al. |
| 5,911,008 A | 6/1999 | Niikura et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B1 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,496,293 B2 | 2/2009 | Shamir et al. |
| 7,564,019 B2 | 7/2009 | Olsen et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |

(56) References Cited

U.S. PATENT DOCUMENTS

| | | |
|---|---|---|
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,792,710 B2 | 7/2014 | Keselman |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,049,367 B2 | 6/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,638,883 B1 | 5/2017 | Duparre |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,892,522 B2 | 2/2018 | Smirnov et al. |
| 10,482,618 B2 | 11/2019 | Jain et al. |
| 10,818,026 B2 | 10/2020 | Jain et al. |
| 11,562,498 B2 | 1/2023 | Jain et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |

(56) References Cited

U.S. PATENT DOCUMENTS

| | | |
|---|---|---|
| 2002/0057845 A1 | 5/2002 | Fossum et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |

(56) References Cited

U.S. PATENT DOCUMENTS

| | | |
|---|---|---|
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer et al. |
| 2007/0236595 A1 | 10/2007 | Pan et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194901 A1 | 8/2010 | van Hoorebeke et al. |
| 2010/0195716 A1 | 8/2010 | Klein Gunnewiek et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |

(56) References Cited

U.S. PATENT DOCUMENTS

| | | |
|---|---|---|
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0206291 A1 | 8/2011 | Kashani et al. |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0228142 A1 | 9/2011 | Brueckner et al. |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0287291 A1 | 11/2012 | McMahon |
| 2012/0293695 A1 | 11/2012 | Tanaka |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |

(56) References Cited

U.S. PATENT DOCUMENTS

| | | |
|---|---|---|
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0091900 A1 | 4/2015 | Yang et al. |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0199841 A1 | 7/2015 | Venkataraman et al. |
| 2015/0243480 A1 | 8/2015 | Yamada |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309134 A1 | 10/2016 | Venkataraman et al. |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |

(56) References Cited

U.S. PATENT DOCUMENTS

| | | |
|---|---|---|
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2019/0057513 A1 | 2/2019 | Jain et al. |
| 2020/0151894 A1 | 5/2020 | Jain et al. |
| 2021/0042952 A1 | 2/2021 | Jain et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 111066065 A | 4/2020 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| EP | 2381418 A1 | 10/2011 |
| EP | 3673461 A1 | 7/2020 |
| EP | 3673461 B1 | 9/2021 |
| EP | 3971825 A1 | 3/2022 |
| GB | 2482022 A | 1/2012 |
| JP | 59-025483 | 2/1984 |
| JP | 64-037177 | 2/1989 |
| JP | 02-285772 A | 11/1990 |
| JP | 07-015457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2013526801 A | 6/2013 |
| JP | 2014521117 A | 8/2014 |
| KR | 1020110097647 A | 8/2011 |
| TW | 200828994 A | 7/2008 |
| TW | 200939739 A | 9/2009 |
| WO | 2005057922 A1 | 6/2005 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2019038193 A1 | 2/2019 |

OTHER PUBLICATIONS

Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 7 Pgs.

(56) References Cited

OTHER PUBLICATIONS

Extended European Search Report for European Application EP12835041.0, Report Completed Jan. 28, 2015, dated Feb. 4, 2015, 6 Pgs.
Extended European Search Report for European Application EP13751714.0, completed Aug. 5, 2015, dated Aug. 18, 2015, 8 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 pgs.
Extended European Search Report for European Application No. 14860103.2, Search completed Feb. 23, 2017, dated Mar. 3, 2017, 7 Pgs.
Extended European Search Report for European Application No. 21193887.3, Search completed Feb. 4, 2022, dated Feb. 15, 2022, 11 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, Issued Mar. 17, 2015, dated Mar. 26, 2015, 8 pgs.
International Preliminary Report on Patentability for International Application PCT/US10/057661, issued May 22, 2012, dated May 31, 2012, 10 pages.
International Preliminary Report on Patentability for International Application PCT/US13/56065, Issued Feb. 24, 2015, dated Mar. 5, 2015, 4 Pgs.
International Preliminary Report on Patentability for International Application PCT/US2013/024987, dated Aug. 12, 2014, 13 Pgs.
International Preliminary Report on Patentability for International Application PCT/US2013/027146, completed Aug. 26, 2014, dated Sep. 4, 2014, 10 Pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, issued Dec. 31, 2014, dated Jan. 8, 2015, 6 Pgs.
International Preliminary Report on Patentability for International Application PCT/US2013/048772, issued Dec. 31, 2014, dated Jan. 8, 2015, 8 Pgs.
International Preliminary Report on Patentability for International Application PCT/US2013/056502, Issued Feb. 24, 2015, dated Mar. 5, 2015, 7 Pgs.
International Preliminary Report on Patentability for International Application PCT/US2013/069932, issued May 19, 2015, dated May 28, 2015, 12 Pgs.
International Preliminary Report on Patentability for International Application PCT/US2014/017766, issued Aug. 25, 2015, dated Sep. 3, 2015, 8 Pgs.
International Preliminary Report on Patentability for International Application PCT/US2014/018084, issued Aug. 25, 2015, dated Sep. 3, 2015, 11 Pgs.
International Preliminary Report on Patentability for International Application PCT/US2014/018116, issued Sep. 15, 2015, dated Sep. 24, 2015, 12 Pgs.
International Preliminary Report on Patentability for International Application PCT/US2014/021439, issued Sep. 15, 2015, dated Sep. 24, 2015, 9 Pgs.
International Preliminary Report on Patentability for International Application PCT/US2014/022118, issued Sep. 8, 2015, dated Sep. 17, 2015, 4 pgs.
International Preliminary Report on Patentability for International Application PCT/US2014/022123, issued Sep. 8, 2015, dated Sep. 17, 2015, 4 Pgs.
International Preliminary Report on Patentability for International Application PCT/US2014/022774, issued Sep. 22, 2015, dated Oct. 1, 2015, 5 Pgs.
International Preliminary Report on Patentability for International Application PCT/US2014/023762, issued Mar. 2, 2015, dated Mar. 9, 2015, 10 Pgs.
International Preliminary Report on Patentability for International Application PCT/US2014/024407, issued Sep. 15, 2015, dated Sep. 24, 2015, 8 Pgs.
International Preliminary Report on Patentability for International Application PCT/US2014/024903, issued Sep. 15, 2015, dated Sep. 24, 2015, 12 Pgs.
International Preliminary Report on Patentability for International Application PCT/US2014/024947, issued Sep. 15, 2015, dated Sep. 24, 2015, 7 Pgs.
International Preliminary Report on Patentability for International Application PCT/US2014/025100, issued Sep. 15, 2015, dated Sep. 24, 2015, 4 Pgs.
International Preliminary Report on Patentability for International Application PCT/US2014/025904, issued Sep. 15, 2015, dated Sep. 24, 2015, 5 Pgs.
International Preliminary Report on Patentability for International Application PCT/US2014/028447, issued Sep. 15, 2015, dated Sep. 24, 2015, 7 Pgs.
International Preliminary Report on Patentability for International Application PCT/US2014/030692, issued Sep. 15, 2015, dated Sep. 24, 2015, 6 Pgs.
International Preliminary Report on Patentability for International Application PCT/US2014/064693, issued May 10, 2016, dated May 19, 2016, 14 Pgs.
International Preliminary Report on Patentability for International Application PCT/US2014/066229, issued May 24, 2016, dated Jun. 2, 2016, 9 Pgs.
International Preliminary Report on Patentability for International Application PCT/US2014/067740, issued May 31, 2016, dated Jun. 9, 2016, 9 Pgs.
International Preliminary Report on Patentability for International Application PCT/US2015/019529, issued Sep. 13, 2016, dated Sep. 22, 2016, 9 Pgs.
International Preliminary Report on Patentability for International Application PCT/US13/62720, Issued Mar. 31, 2015, dated Apr. 9, 2015, 8 Pgs.
International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.

(56) References Cited

OTHER PUBLICATIONS

International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application No. PCT/EP2018/072303, Search completed Nov. 13, 2018, dated Nov. 26, 2018, 14 Pgs.
International Search Report and Written Opinion for International Application PCT/US11/36349, dated Aug. 22, 2011, 11 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/17766, completed May 28, 2014, dated Jun. 18, 2014, 9 Pgs.
International Search Report and Written Opinion for International Application PCT/US14/18084, completed May 23, 2014, dated Jun. 10, 2014, 12 pgs.
International Search Report and Written Opinion for International Application PCT/US14/18116, Report completed May 13, 2014, 12 pgs.
International Search Report and Written Opinion for International Application PCT/US14/21439, completed Jun. 5, 2014, dated Jun. 20, 2014, 10 Pgs.
International Search Report and Written Opinion for International Application PCT/US14/22118, completed Jun. 9, 2014, dated Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug. 7, 2014, 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2009/044687, completed Jan. 5, 2010, dated Jan. 13, 2010, 9 pgs.
International Search Report and Written Opinion for International Application PCT/US2010/057661, completed Mar. 9, 2011, 14 pgs.
International Search Report and Written Opinion for International Application PCT/US2011/064921, completed Feb. 25, 2011, dated Mar. 6, 2012, 17 pgs.
International Search Report and Written Opinion for International Application PCT/US2012/037670, dated Jul. 18, 2012, Completed Jul. 5, 2012, 9 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/058093, Report completed Nov. 15, 2012, 12 pgs.
International Search Report and Written Opinion for International Application PCT/US2012/059813, completed Dec. 17, 2012, 8 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
Supplementary European Search Report for EP Application No. 13831768.0, Search completed May 18, 2016, dated May 30, 2016, 13 Pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", Institute of Microelectronic Systems, Leibniz University of Hanover, Nov. 7, 2011, 20 pgs.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, May 2007, published Apr. 16, 2007, vol. 16, No. 5, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.

(56) References Cited

OTHER PUBLICATIONS

Borman et al., "Image Resampling and Constraint Formulation for Multi-Frame Super-Resolution Restoration", Proc. SPIE, published Jul. 1, 2003, vol. 5016, 12 pgs.

Borman et al., "Linear models for multi-frame super-resolution restoration under non-affine registration and spatially varying PSF", Proc. SPIE, May 21, 2004, vol. 5299, 12 pgs.

Borman et al., "Nonlinear Prediction Methods for Estimation of Clique Weighting Parameters in NonGaussian Image Models", Proc. SPIE, Sep. 22, 1998, vol. 3459, 9 pgs.

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

Borman et al., "Super-Resolution from Image Sequences—A Review", Circuits & Systems, 1998, pp. 374-378.

Bose et al., "Superresolution and Noise Filtering Using Moving Least Squares", IEEE Transactions on Image Processing, Aug. 2006, vol. 15, Issue 8, published Jul. 17, 2006, pp. 2239-2248.

Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, May 13, 2010, 11 pgs.

Bruckner et al., "Thin wafer-level camera lenses inspired by insect compound eyes", Optics Express, Nov. 22, 2010, vol. 18, No. 24, pp. 24379-24394.

Bryan et al., "Perspective Distortion from Interpersonal Distance Is an Implicit Visual Cue for Social Judgments of Faces", PLOS One, vol. 7, Issue 9, Sep. 26, 2012, e45301, doi: 10.1371/journal.pone.0045301, 9 pages.

Capel, "Image Mosaicing and Super-resolution", Retrieved on Nov. 10, 2012, Retrieved from the Internet at URL :<http://citeseerx.ist.psu.edu/viewdoc/download?doi=10.1.1.226.2643&rep=rep1&type=pdf>, 2001, 269 pgs.

Carroll et al., "Image Warps for Artistic Perspective Manipulation", ACM Transactions on Graphics (TOG), vol. 29, No. 4, Jul. 26, 2010, Article No. 127, 9 pgs.

Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.

Chan et al., "Investigation of Computational Compound-Eye Imaging System with Super-Resolution Reconstruction", IEEE, ISASSP, Jun. 19, 2006, pp. 1177-1180.

Chan et al., "Super-resolution reconstruction in a computational compound-eye imaging system", Multidim Syst Sign Process, published online Feb. 23, 2007, vol. 18, pp. 83-101.

Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.

Chen et al., "Interactive deformation of light fields", Symposium on Interactive 3D Graphics, 2005, pp. 139-146.

Chen et al., "KNN matting", 2012 IEEE Conference on Computer Vision and Pattern Recognition, Jun. 16-21, 2012, Providence, RI, USA, pp. 869-876.

Chen et al., "KNN Matting", IEEE Transactions on Pattern Analysis and Machine Intelligence, Sep. 2013, vol. 35, No. 9, pp. 2175-2188.

Cooper et al., "The perceptual basis of common photographic practice", Journal of Vision, vol. 12, No. 5, Article 8, May 25, 2012, pp. 1-14.

Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.

Debevec et al., "Recovering High Dynamic Range Radiance Maps from Photographs", Computer Graphics (ACM SIGGRAPH Proceedings), Aug. 16, 1997, 10 pgs.

Do, Minh N., "Immersive Visual Communication with Depth", Presented at Microsoft Research, Jun. 15, 2011, Retrieved from: http://minhdo.ece.illinois.edu/talks/ImmersiveComm.pdf, 42 pgs.

Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.

Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.

Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.

Drouin et al., "Improving Border Localization of Multi-Baseline Stereo Using Border-Cut", International Journal of Computer Vision, Jul. 5, 2006, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, Nov. 21, 2008, vol. 3, pp. 1-6.

Duparre et al., "Artificial compound eyes—different concepts and their application to ultra flat image acquisition sensors", MOEMS and Miniaturized Systems IV, Proc. SPIE 5346, Jan. 24, 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, Apr. 6, 2006, vol. 1, pp. R1-R16.

Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.

Duparre et al., "Microoptical Artificial Compound Eyes—Two Different Concepts for Compact Imaging Systems", 11th Microoptics Conference, Oct. 30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, Apr. 21, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 2005, vol. 44, No. 15, pp. 2949-2956.

Duparre et al., "Ultra-Thin Camera Based on Artificial Apposition Compound Eyes", 10th Microoptics Conference, Sep. 1-3, 2004, 2 pgs.

Eng et al., "Gaze correction for 3D tele-immersive communication system", IVMSP Workshop, 2013 IEEE 11th. IEEE, Jun. 10, 2013.

Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.

Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.

Farrell et al., "Resolution and Light Sensitivity Tradeoff with Pixel Size", Proceedings of the SPIE Electronic Imaging 2006 Conference, Feb. 2, 2006, vol. 6069, 8 pgs.

(56) References Cited

OTHER PUBLICATIONS

Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching", ISPRS Annals of the Photogrammetry, Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of I3D, Jan. 1, 2007, pp. 121-128.
Humenberger er al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), Jun. 17-22, 2006, vol. 1, New York, NY, USA, pp. 371-378.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Konolige, Kurt, "Projected Texture Stereo", 2010 IEEE International Conference on Robotics and Automation, May 3-7, 2010, p. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., Doi: 10.1109/ICRA.201135980382.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.

(56) References Cited

OTHER PUBLICATIONS

Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
LensVector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www. eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pages.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
NG, "Digital Light Field Photography", Thesis, Jul. 2006, 203 pgs.
NG et al., "Light Field Photography with a Hand-held Plenoptic Camera", Stanford Tech Report CTSR Feb. 2005, Apr. 20, 2005, pp. 1-11.
NG et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H.K., "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.

(56) References Cited

OTHER PUBLICATIONS

Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs, DOI: 10.1109/ICCV.1998.710696 • Source: DBLP Conference: Computer Vision, Sixth International Conference.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", in Visual Communications and Image Processing 2000, May 2000, vol. 4067, pp. 2-13.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.

Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

(56) References Cited

OTHER PUBLICATIONS

Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
Computer English Translation of Korean Patent No. KR 10-1707939 B1, 2017, pp. 1-11.
International Preliminary Report on Patentability for International Application PCT/EP2018/072303, Report issued Feb. 25, 2020, dated Mar. 5, 2020, 8 Pgs.

595a

595b

595c

595d

595e

SYSTEMS AND METHODS FOR HYBRID DEPTH REGULARIZATION

CROSS-REFERENCE TO RELATED APPLICATIONS

The current application is a continuation of U.S. Non-Provisional patent application Ser. No. 17/078,732 entitled "System and Methods for Hybrid Depth Regularization" to Jain et al. filed Oct. 23, 2020, which is a continuation of U.S. Non-Provisional patent application Ser. No. 16/685,881 entitled "System and Methods for Hybrid Depth Regularization" to Jain et al. filed Nov. 15, 2019, which is a continuation of U.S. Non-Provisional patent application Ser. No. 15/682,295, entitled "System and Methods for Hybrid Depth Regularization" to Jain et al. filed Aug. 21, 2017 and issued as U.S. Pat. No. 10,482,618 on Nov. 19, 2019.

FIELD OF THE INVENTION

The present invention relates generally to estimating depth in images, and more specifically to systems and methods for hybrid depth regularization.

BACKGROUND

Computer stereo vision is used in a variety of contexts to obtain three-dimensional (3D) information from a scene using image data from two different viewpoints. Applications of stereo vision include 3D displays in entertainment, robotics, augmented reality, and other contexts to distinguish amongst positions of objects. Using principles of parallax, or by comparing the positions of objects within two differing views of a scene, relative depth information may be extracted to form a depth map indicating the distances of objects in a scene from a viewpoint.

SUMMARY OF THE INVENTION

Systems and methods for hybrid depth regularization in accordance with various embodiments of the invention are disclosed.

In one embodiment of the invention, a depth sensing system, comprises a plurality of cameras; a processor; a memory containing an image processing application. The image processing application directs the processor to obtain image data for a plurality of images from multiple viewpoints using the plurality of cameras, wherein the image data for the plurality of images comprises a reference image and at least one alternate view image; generate a raw depth map containing depth estimates for pixels within the reference image using the image data for the reference image and the image data for the at least one alternate view image using a first depth estimation process, and a confidence map describing reliability of depth estimates contained within the raw depth map; and generate a regularized depth map. The regularized depth map is generated by computing a secondary depth map containing depth estimates for pixels within the reference image using a second different depth estimation process; and computing a composite depth map by selecting depth estimates from the raw depth map and the secondary depth map, where a depth estimate for a pixel in the reference image is selected from the raw depth map when the depth estimate is indicated as being reliable by the confidence map.

In a further embodiment, the composite depth map is a first composite depth map and the image processing application further directs the processor to generate a regularized depth map by computing a second composite depth map. The second composite depth map is computed by applying a smoothing filter to depth estimates in the first composite depth map; computing an edge map using the filtered first composite depth map, where the edge map indicates pixels within the reference image that form part of an edge; and computing a second composite depth map by selecting depth estimates from the raw depth map and the filtered first composite depth map, where a depth estimate for a pixel in the reference image is selected from the raw depth map when the edge map indicates that the depth estimate is with respect to a pixel from the reference image that forms part of an edge.

In another embodiment, the smoothing filter is a median filter.

In a yet further embodiment, the image processing application further directs the processor to generate a regularized depth map by applying an edge preserving filter to the second composite depth map.

In yet another embodiment, the image processing application further directs the processor to apply an edge preserving filter to at least one region of the second composite depth map indicated as containing a depth discontinuity by the edge map.

In a still further embodiment, the edge preserving filter is a bilateral filter with weights determined using the raw depth map and the reference image.

In still another embodiment, the image processing application further directs the processor to compute the second composite depth map by applying edge detection to the filtered first composite depth map to result in an edge-detected depth map; and dilating the edge-detected depth map to result in the edge map.

In a further additional embodiment, the image processing application further directs the processor to generate a regularized depth map by identifying a first set of edges in the reference image; identifying a second set of edges in the edge map, the first and second sets of edges indicating regions with depth discontinuities; calculating a set of weights for areas in the second composite depth map based on the first and second sets of edges; and applying the edge preserving filter to the second composite depth map using the set of weights.

In another additional embodiment, the image processing application further directs the processor to generate a raw depth map containing depth estimates for pixels within the reference image using the image data for the reference image and the image data for the at least one alternate view image, and a confidence map describing reliability of depth estimates contained within the depth map, by measuring parallax observable between the reference image and the at least one alternate view image.

In another further embodiment, the image processing application further directs the processor to estimate depth based upon measured parallax observable between the reference image and the at least one alternate view image by measuring parallax by comparing the similarity of a pixel in the reference image to pixels in the at least one alternate view image determined based upon a plurality of depth samples using a cost function; estimating depth for the pixel in the reference image by identifying the sampled depth at which the cost function for a pixel in the reference image indicates the strongest match as being the estimated depth of the pixel.

In still another further embodiment, the image processing application further directs the processor to construct a cost volume in memory using costs determined using the cost function at each sampled depth.

In a still yet further embodiment, the image processing application further directs the processor to compute the secondary depth map based on the cost volume.

In still yet another embodiment, the image processing application further directs the processor to compute the secondary depth map using a second depth estimation process comprising downsampling the reference image and the cost volume; and estimating depths to enforce smooth depth transitions within the secondary depth map in textureless regions of the reference image using the cost volume.

In a further embodiment again, the image processing application further directs the processor to compute the composite depth map by determining that a depth estimate for a pixel from the raw depth map is reliable when a confidence value for the pixel from the confidence map is above a threshold.

In another embodiment again, the image processing application further directs the processor to identify at least one corresponding region within the reference image and the at least one alternate view image using at least one criterion; generate binary images with respect to the reference image and the at least one alternate view image based upon the identified at least one corresponding region; subtract shifted versions of the reference image and the at least one alternate view image when the shifts correspond to a plurality of depth samples to produce a shifted and subtracted image for each of the plurality of depth samples; identify boundaries within the shifted and subtracted images; identify areas of the boundaries within the shifted and subtracted images; and determine depth estimates for pixels at a boundary of an identified region in the reference image based upon the depth sample at which the area of the boundary in the shifted and subtracted image is minimized.

A depth sensing method, according to a yet further embodiment again, comprises obtaining image data for a plurality of images from multiple viewpoints using the plurality of cameras, wherein the image data for the plurality of images comprises a reference image and at least one alternate view image; generating a raw depth map containing depth estimates for pixels within the reference image using the image data for the reference image and the image data for the at least one alternate view image using a first depth estimation process, and a confidence map describing reliability of depth estimates contained within the raw depth map; and generating a regularized depth map. The regularized depth map is generated by computing a secondary depth map containing depth estimates for pixels within the reference image using a second different depth estimation process; and computing a composite depth map by selecting depth estimates from the raw depth map and the secondary depth map, where a depth estimate for a pixel in the reference image is selected from the raw depth map when the depth estimate is indicated as being reliable by the confidence map.

In yet another embodiment again, the composite depth map is a first composite depth map and generating a regularized depth map further comprises computing a second composite depth map by applying a smoothing filter to depth estimates in the first composite depth map; computing an edge map using the filtered first composite depth map, where the edge map indicates pixels within the reference image that form part of an edge; and computing a second composite depth map by selecting depth estimates from the raw depth map and the filtered first composite depth map, where a depth estimate for a pixel in the reference image is selected from the raw depth map when the edge map indicates that the depth estimate is with respect to a pixel from the reference image that forms part of an edge.

In a still further embodiment again, the smoothing filter is a median filter.

In still another embodiment again, generating a regularized depth map further comprises applying an edge preserving filter to the second composite depth map.

In a further additional embodiment again, the depth sensing method further comprises applying an edge preserving filter to at least one region of the second composite depth map indicated as containing a depth discontinuity by the edge map.

In another additional embodiment again, the edge preserving filter is a bilateral filter with weights determined using the raw depth map and the reference image.

In another further embodiment again, generating a regularized depth map further comprises identifying a first set of edges in the reference image; identifying a second set of edges in the edge map, the first and second sets of edges indicating regions with depth discontinuities; calculating a set of weights for areas in the second composite depth map based on the first and second sets of edges; and applying the edge preserving filter to the second composite depth map using the set of weights.

In still another further embodiment again, generating a raw depth map containing depth estimates for pixels within the reference image using the image data for the reference image and the image data for the at least one alternate view image, and a confidence map describing reliability of depth estimates contained within the depth map, further comprises measuring parallax observable between the reference image and the at least one alternate view image.

In a still yet further embodiment again, the depth sensing method further comprises estimating depth based upon measured parallax observable between the reference image and the at least one alternate view image by measuring parallax by comparing the similarity of a pixel in the reference image to pixels in the at least one alternate view image determined based upon a plurality of depth samples using a cost function; and estimating depth for the pixel in the reference image by identifying the sampled depth at which the cost function for a pixel in the reference image indicates the strongest match as being the estimated depth of the pixel.

In still yet another embodiment again, the depth sensing method further comprises generating cost volume using costs determined using the cost function at each sampled depth.

In a further embodiment, the depth sensing method further comprises computing the secondary depth map based on the cost volume.

In another embodiment, computing the secondary depth map using a second depth estimation process comprises downsampling the reference image and the cost volume; and estimating depths to enforce smooth depth transitions within the secondary depth map in textureless regions of the reference image using the cost volume.

In a yet further embodiment, computing the composite depth map further comprises determining that a depth estimate for a pixel from the raw depth map is reliable when a confidence value for the pixel from the confidence map is above a threshold.

In yet another embodiment, computing the second composite depth map further comprises applying edge detection to the filtered first composite depth map to result in an edge-detected depth map; and dilating the edge-detected depth map to result in the edge map.

In a still further embodiment, the depth sensing method further comprises identifying at least one corresponding region within the reference image and the at least one alternate view image using at least one criterion; generating binary images with respect to the reference image and the at least one alternate view image based upon the identified at least one corresponding region; subtracting shifted versions of the reference image and the at least one alternate view image when the shifts correspond to a plurality of depth samples to produce a shifted and subtracted image for each of the plurality of depth samples; identifying boundaries within the shifted and subtracted images; identifying areas of the boundaries within the shifted and subtracted images; and determining depth estimates for pixels at a boundary of an identified region in the reference image based upon the depth sample at which the area of the boundary in the shifted and subtracted image is minimized.

DETAILED DESCRIPTION

Turning now to the drawings, systems and methods for hybrid depth regularization in accordance with various embodiments of the invention are illustrated. In a number of applications, it is desirable for 3D displays to be rendered in real time. As an example and not by way of limitation, augmented reality (AR) can be used to provide computer-generated video, graphics and/or sound in the context of a real-world physical environment. AR can be used for entertainment such as but not limited to gaming, and may employ one or more various display technologies such as head-mounted displays, monitors, and/or hand-held devices. For live AR purposes, the corresponding depth data for a scene should also be calculated in real time so as to provide the relevant information for rendering 3D displays. However, the depth data used for real-time applications are often noisy and less than accurate.

Regularization is a technique whereby constraints are imposed on a computational model, based on priors or side information, to solve for a variable in the model from a set of noisy or incomplete measurements. Specifically, in the case of depth estimation from a passive stereo system, parallax measurements may only be well-defined in the presence of unambiguous features. Spatially periodic patterns or textureless regions are ill-posed in that a potentially large number of disparities could produce the minimizing cost from a local correspondence search. Non-Lambertian surfaces, occlusions, and spatially varying lens characteristics, among many other factors, may also introduce errors into depth estimates obtained by observing parallax evident in multiple images of a scene. Depth regularization seeks to mitigate noise and errors in parallax estimation resulting from both scene and system characteristics.

In many embodiments of the invention, processes for improvement of depth map quality are capable of being performed in real time, and may, for example, run at rates up to and in excess of 25 frames/second on a mobile processor in low-power mode. In a number of embodiments of the invention, depth regularization processes employ a hybrid of depth regularization (that traditionally optimizes all pixels simultaneously), and various other filtering techniques based upon the characteristics of different regions in a scene to increase computational efficiency. In a number of embodiments, regions within a scene are categorized into different types of regions and treated using region-specific techniques, with only certain regions being processed using computationally intensive depth regularization techniques. The cost functions, filters, and parameters discussed herein are particular examples, and the scope of the invention is not limited to these particular constraints. Systems and methods for performing hybrid depth regularization in accordance with various embodiments of the invention are discussed further below.

Processes for Performing Hybrid Depth Regularization

Figure 1A:
FIGS. 1A-B illustrate an image and a corresponding depth map.
Figure 1B:

A depth map is an image or image channel that contains information relating to distances from a viewpoint to surfaces of objects visible within a scene. By way of example, an image is shown in FIG. 1A with its corresponding depth map shown in FIG. 1B. While much of the discussion that follows involves correspondence between a color image and a depth map, image data can be acquired for the sole purpose of obtaining depth data. Accordingly, hybrid depth regularization processes in accordance with many embodiments of the invention generate depth maps for which no corresponding color image is generated. The depth map in FIG. 1B indicates distances to various objects in the scene and the background. Various imaging systems employing arrays of two or more cameras exist that are capable of capturing image data from the visible light and/or near infrared spectrum and producing a corresponding depth map including (but not limited to) the array camera systems described in U.S. Patent Publication No. 2016/0309134 entitled "Multi-Baseline Camera Array System Architecture for Depth Augmentation in VR/AR Applications", to Venkataraman et al., and U.S. Patent Publication No. 2011/0069189 entitled "Capturing and Processing of Images Using Monolithic Camera Array with Heterogeneous Imagers", to Venkataraman et al. The disclosures within U.S. Patent Publication Nos. 2016/0309134 and 2011/0069189 regarding the implementation of different array camera architectures including monolithic array cameras, non-monolithic array cameras, and arrays of array cameras is hereby incorporated by reference herein in its entirety.

Processes for hybrid depth regularization in accordance with many embodiments of the invention are used to improve the accuracy of depth maps. In many embodiments, the hybrid depth regularization processes are capable of executing in real-time to provide depth information for a variety of purposes including (but not limited to) previewing images generated through fusion and/or other computational imaging techniques, and/or generating user interfaces for augmented reality and mixed reality displays. Depth regularization processes similar to those described in U.S. Patent Publication No. 2015/0091900 entitled "Systems and Methods for Depth-Assisted Perspective Distortion Correction", to Yang et al., estimate depth globally, by augmenting a correlation cost function with a smoothness prior and other constraints, and solving the resulting optimization problem for all pixels simultaneously. In situations with certain computational bandwidth and memory limitations, this approach may not be practical. Further, different components of a mobile chipset, such as the digital/image signal processor (DSP/ISP), central processing unit (CPU), or graphics processing unit (GPU), may be better suited for different tasks and have varying resources, to perform different modules of an overall process.

Figure 2:
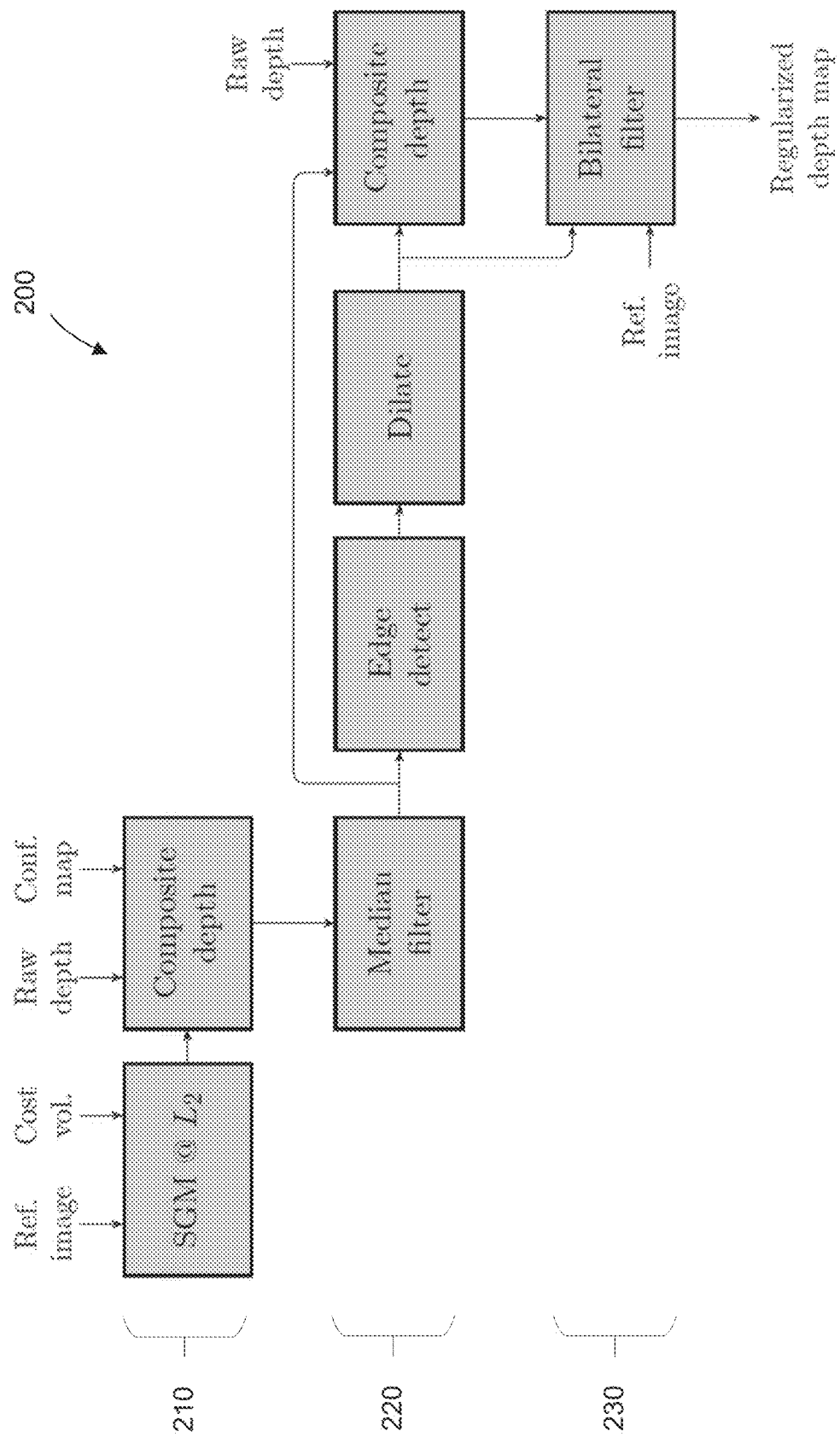
FIG. 2 illustrates a conceptual diagram of a hybrid depth regularization method in accordance with an embodiment of the invention.

FIG. 2 illustrates a conceptual diagram of a hybrid depth regularization method 200 with inputs and outputs, according to an embodiment of the invention. Each of three phases 210, 220 and 230, represented by a row in the diagram, treats pixels in a scene with similar characteristics. According to certain embodiments of the invention, the first phase 210 determines depths for textureless regions in an image (i.e. regions that do not possess distinctive features). In the second phase 220, the resulting depth map is denoised and depth discontinuities are detected. Finally in the third phase 230, the detected edges in depth are processed to be consistent with the image edges.

In a number of embodiments of the invention, the phases may be run sequentially rather than in parallel for relatively better depth map quality. As an example and not by way of limitation, using output from the first phase 210 in the second phase 220 may result in better performance requiring fewer steps, less parameterization, and reduced false alarm rate of depth discontinuity detection. These benefits may in turn reduce the required computations in the third phase 230, which may be considered a computationally intensive part of the process.

Figure 3:
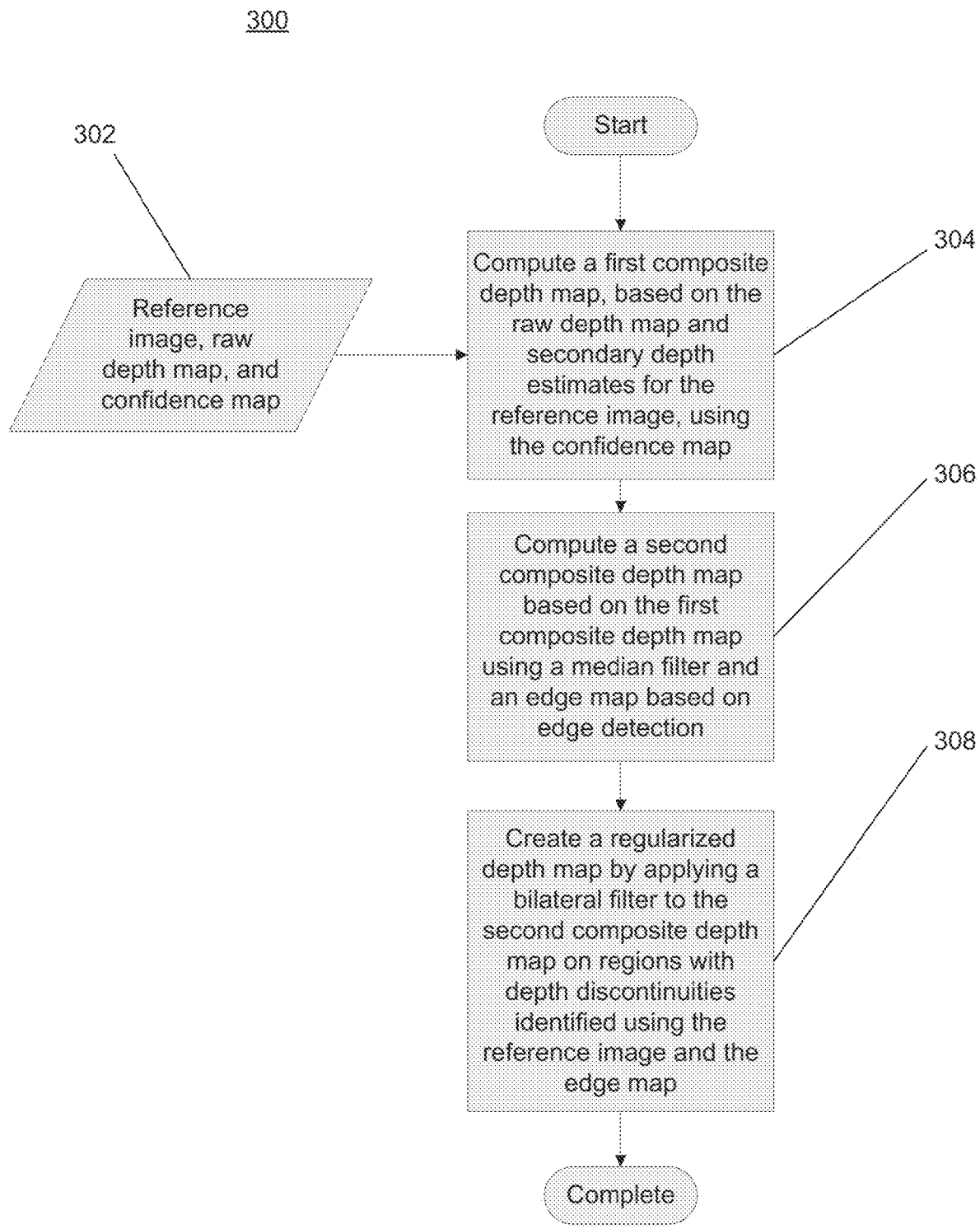
FIG. 3 is a flowchart illustrating a hybrid depth regularization process in accordance with an embodiment of the invention.
Figure 4A:
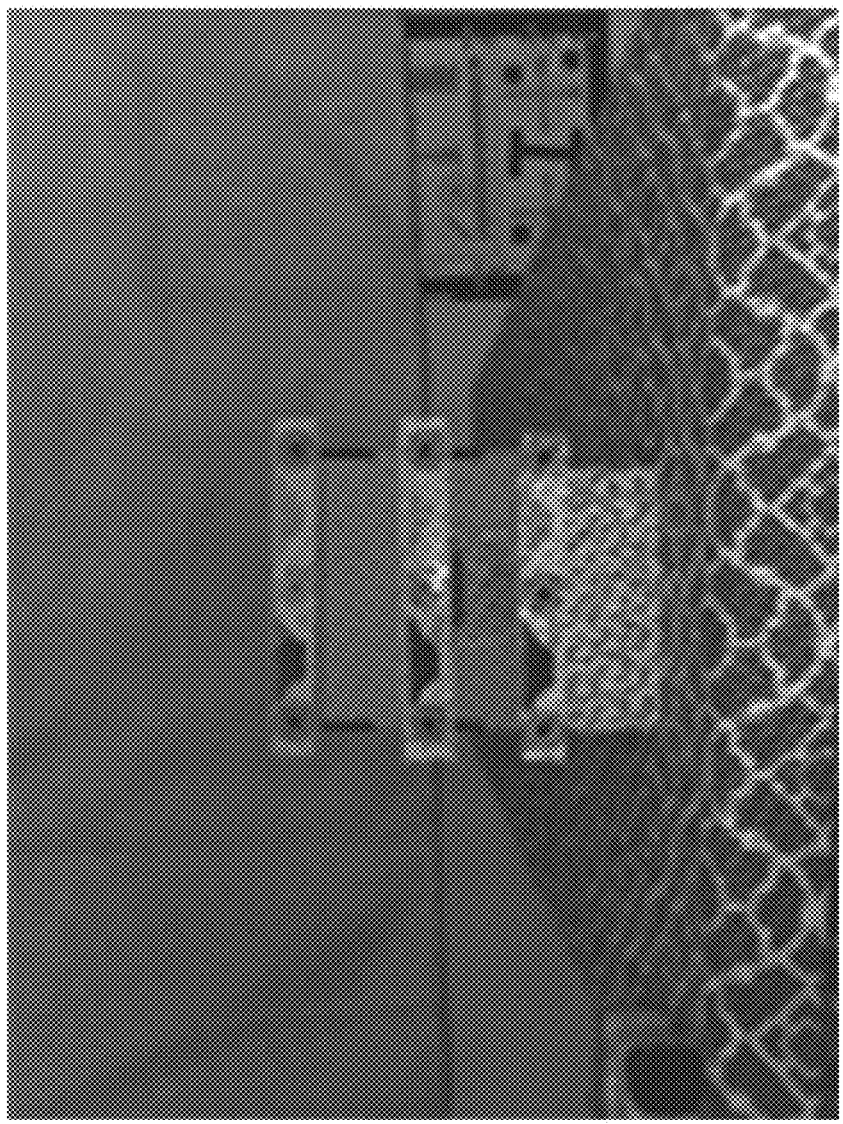
FIG. 4A shows a reference image after normalization stages in one implementation of a hybrid depth regularization process in accordance with an embodiment of the invention.
Figure 4B:
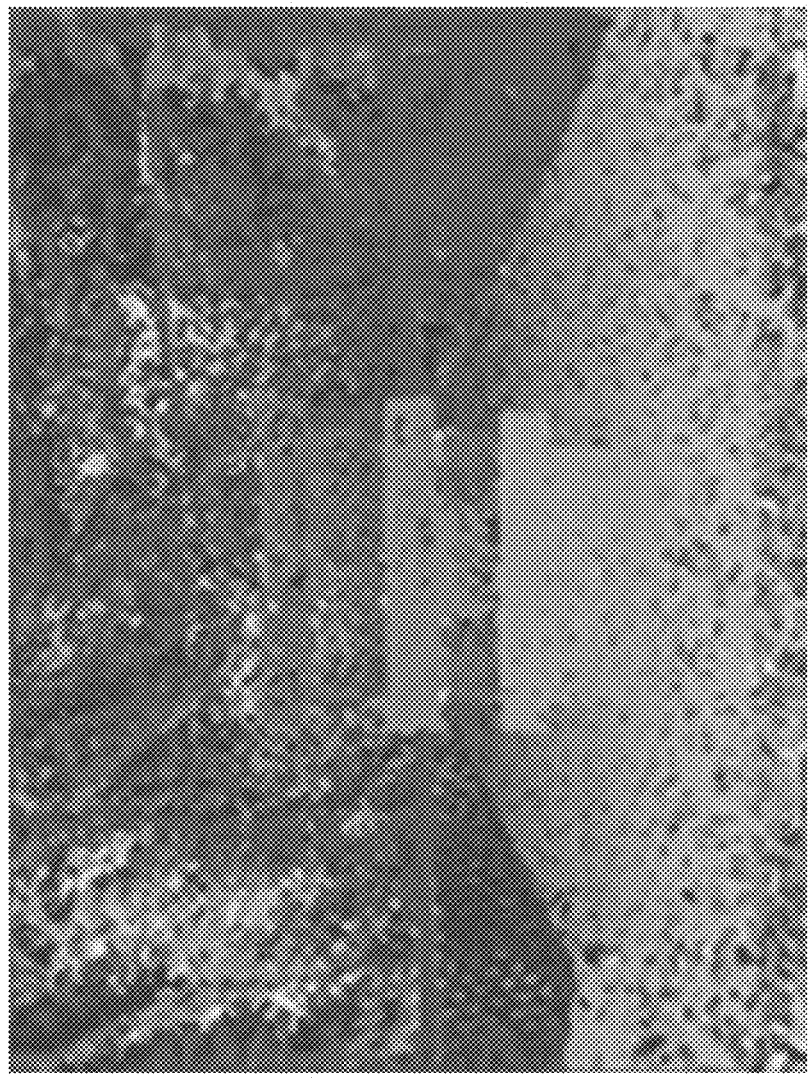
FIG. 4B shows a raw depth map from a parallax stage in one implementation of a hybrid depth regularization process in accordance with an embodiment of the invention.
Figure 4C:
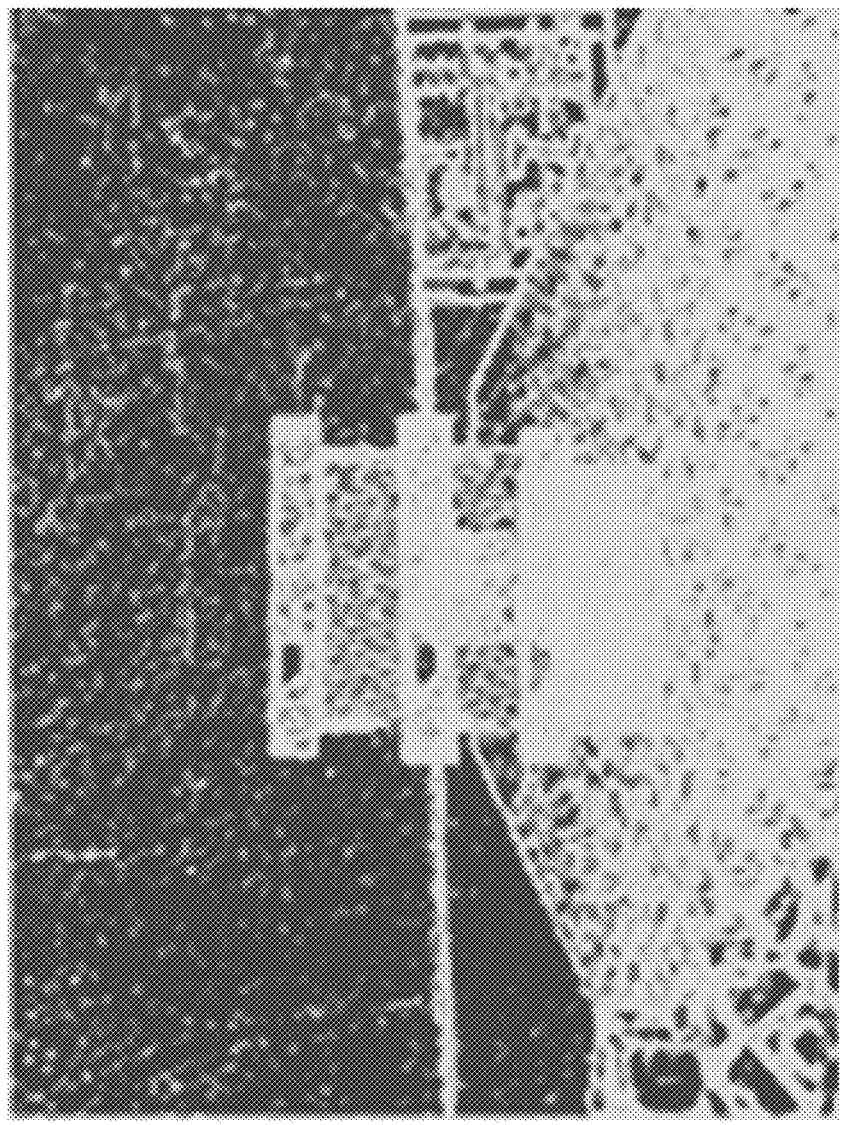
FIG. 4C shows a binary confidence map from a parallax stage in a hybrid depth regularization process in accordance with an embodiment of the invention.

A flowchart illustrating a hybrid depth regularization process 300 according to another embodiment of the invention is shown in FIG. 3. The process 300 includes obtaining (302) image data describing an image captured from multiple viewpoints, such as via a stereo configuration of cameras. The image data may include a reference image, a raw depth map, and a confidence map. The reference image is typically an image captured from one of the multiple viewpoints (as opposed to an image synthesized from a virtual viewpoint), with the raw depth map and confidence map being calculated based on principles of parallax. The depth map describes the distance from a given viewpoint to surfaces of objects visible within the image data, and the confidence map describes the strength of the depth predictions in the raw depth map. In several embodiments, the image data can be contained within an image file similar to any of the image file formats described in U.S. Pat. No. 8,542,933 entitled "Systems and Methods for Decoding Light Field Image Files" to Venkataraman et al. The disclosure in U.S. Pat. No. 8,542,933 concerning storing image data, depth map data, and auxiliary data such as (but not limited to) confidence map data and occluded pixel data, and extracting image data, depth map data, and auxiliary data from image files is hereby incorporated by reference in its entirety. In other embodiments, any of a variety of techniques for storing image data can be utilized as appropriate to the requirements of specific applications. Examples of a reference image 400, a raw depth map 410 and a confidence map 420 are shown in FIGS. 4A-C.

In the first phase of the process 300, depth estimates may be obtained for the textureless regions of the image. A first composite depth map 440 such as that shown in FIG. 4E may be computed (304) based on the raw depth map 410 and secondary depth estimates, such as in map 430 shown in FIG. 4D for the reference image 400, using the confidence map 420. In many embodiments, the secondary depth estimates are generated by utilizing matching costs utilized in the generation of the first depth map (often referred to as the cost volume) to generate depth estimates subject to a consistency constraint. In a number of embodiments, the secondary depth estimates prioritize smoothness in disparity transitions. In other embodiments, any of a variety of processes can be utilized to generate secondary depth estimates having increased confidence in textureless regions. In the second phase of the process 300, a second composite depth map 470 such as that shown in FIG. 4H may be computed (306) based on the first composite depth map 440. This may be performed using a median filter resulting in a median-filtered map 450 such as that shown in FIG. 4F, and an edge map 460 such as that shown in FIG. 4G based on edge detection. Finally, in the third phase of the process 300, a regularized depth map 480 such as that shown in FIG. 4I may be created (308) by applying a bilateral filter to the second composite depth map 470 on regions with depth discontinuities identified using the reference image 400 and the edge map 460. FIGS. 4A-I show potential inputs and outputs for a hybrid depth regularization process according to an embodiment of the invention, but serve merely as examples and are not intended to limit the scope of the invention. As noted above, a reference image may be utilized during hybrid depth regularization and then discarded prior to outputting a regularized depth map. The specific outputs of hybrid depth regularization processes in accordance with various embodiments of the invention are largely dependent upon the requirements of a given application. Further details of processes that may be performed in various phases according to a number of embodiments are described in the sections below.

Although specific processes are described above for hybrid depth regularization with reference to FIGS. 1A-B to 4A-I, any of a variety of processes can be utilized to improve depth map quality in real time in accordance with embodiments of the invention. Processes for the first phase of a hybrid depth regularization process in accordance with embodiments of the invention are discussed further below.

Phase 1: Flat Regions

The responsibility of the first phase of the hybrid depth regularization process according to many embodiments of the invention is to obtain depth estimates for the large, textureless regions of the image. In many regions, where there is a lack of reliable data and proximity to confident depth estimates, a global approach may be well suited for this phase.

Figure 5A:
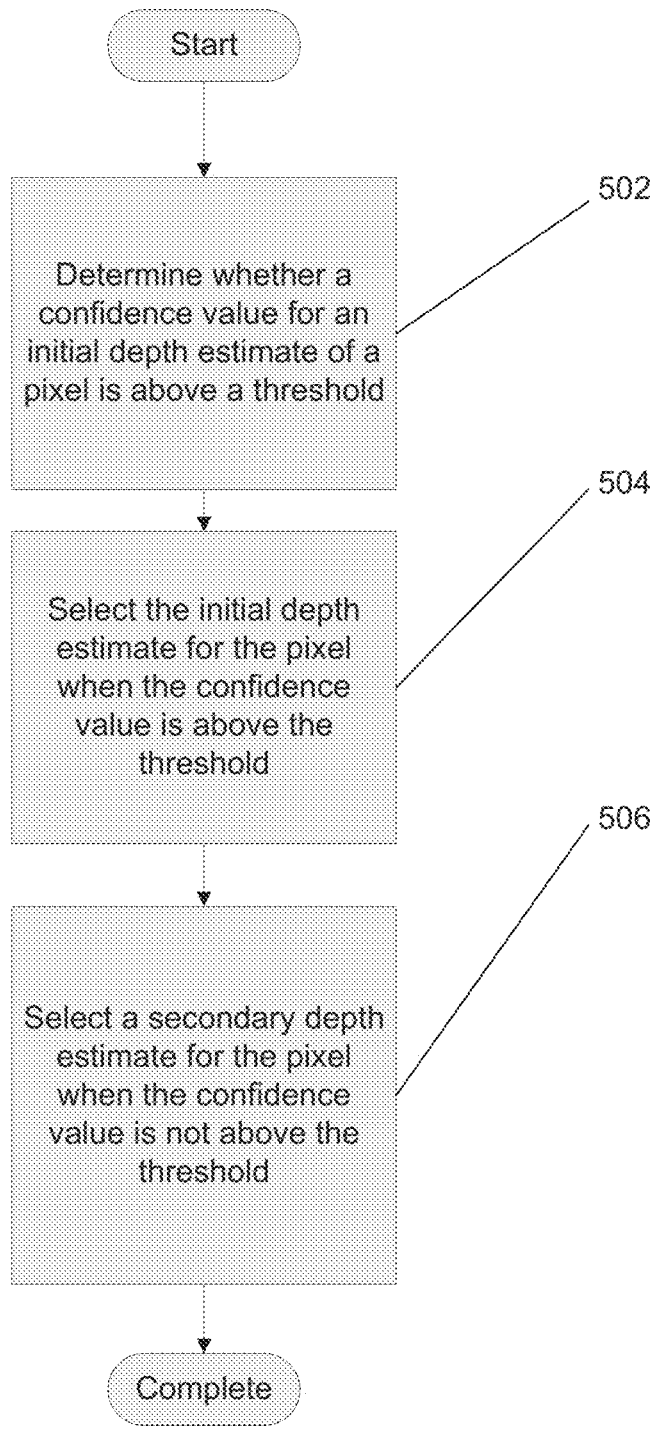
FIG. 5A is a flow chart illustrating a process for computing a first composite depth map in accordance with an embodiment of the invention.

In the first phase of hybrid depth regularization according to one embodiment of the invention, a first composite depth map may be computed using process 500 shown in FIG. 5A. Where the raw depth map includes initial depth estimates, and the confidence map includes confidence values for the initial depth estimates, it can be determined (502) whether the confidence value for the initial depth estimate of a pixel is above a threshold. The threshold may be pre-determined, and may be adjusted according to the specific requirements of an application. When the confidence value is above the threshold, the initial depth estimate may be selected (504) for the pixel. When the confidence value is not above the threshold, a secondary depth estimate for the pixel may be selected (506) instead.

Secondary depth estimates can be calculated using one or more of a variety of processes. In some embodiments of the invention, the image data includes a cost volume indicating matching cost values of pixels during the parallax stage, and the secondary depth estimates may be calculated based on the reference image and the cost volume. In this context, the term cost volume refers to the similarity metrics (also referred to as costs) for each pixel at each depth sample considered for that pixel. A typical depth map is generated based upon the cost for each pixel that indicates the best match. The cost volume provides information concerning other depths at which a pixel had similar cost functions. In a flat region, the cost volume is likely to indicate a number of depths at which similar pixels are observed from an alternative viewpoint. A pixel location for which depth is determined with high confidence is likely to have a single depth at which the matching metric is significantly stronger than at other depths sampled during the initial depth estimation process.

In certain embodiments, secondary depth estimates are obtained using subsampled versions of the image data for increased efficiency. Various approaches may be employed to calculate the secondary depth estimates. As an example and not by way of limitation, one such approach is the semi-global matching (SGM) technique as discussed in H. Hirschmuller, "Accurate and efficient stereo processing by semi-global matching and mutual information," in Proceedings of the 2005 IEEE Computer Society Conference on Computer Vision and Pattern Recognition (CVPR'05), (Washington, DC, USA), pp. 807-814, IEEE Computer Society, 2005, the relevant disclosure of which is hereby incorporated by reference. This method uses a series of one-dimensional optimizations rather than solving a fully global two-dimensional problem in order to economize on computation.

For purposes of filling in the flat regions of the scene, in some embodiments of the invention, SGM may be performed with downsampling, such as (but not limited to) $\frac{1}{16}$th the resolution of the camera (4× subsampling in each direction), to further reduce the amount of computation involved in filling in these regions. The cost volume from the parallax stage of the pipeline and the normalized reference image may be downsampled and processed through the SGM technique. The resulting depth map may be upscaled using nearest-neighbor interpolation. The resulting SGM output may serve as a set of secondary depth estimates. As noted above, the process forms a composite depth map by determining whether to utilize a secondary depth estimate produced through a process such as (but not limited to) SGM or the original depth estimate from the raw depth map based upon a criterion including (but not limited to) the confidence value of the depth estimate exceeding a threshold confidence level. When a raw depth estimate for a particular pixel has an associated high measure of confidence, that initial value is typically used. In other regions, the SGM estimates may be considered more reliable. This first composite depth map can serve as an input to the second phase of the hybrid depth regularization process. While the use of SGM to generate secondary estimates can be effective at achieving real time depth regularization at high frame rates, any of a variety of techniques can be utilized to produce depth estimates for pixels in the raw depth map having raw depth estimates determined with a low level of confidence. For example, hybrid depth regularization processes in accordance with many embodiments of the invention utilize a Laplacian based approach similar to the approach described in U.S. Patent Publication No. 2015/0254868 entitled "System and Methods for Depth Regularization and Semiautomatic Interactive Matting Using RGB-D Images", to Srikanth et al.

An issue that can be encountered when attempting to determine reliable depth estimates for flat or textureless regions is that approaches such as SGM and/or Laplacian approaches rely upon reliable depth estimates at the edges of the textureless regions. When a textureless region is part of the foreground of an image, depth estimates at the edges of the textureless region are typically sufficiently reliable.

When a textureless region is located behind a foreground object, then a portion of the textureless region may not be visible in all of the images of the scene utilized to generate a depth estimate. The problem can be particularly acute when the raw depth map is estimated from a small number of cameras such as a stereo pair. When depth is estimated using a single pair of images, a portion of the textureless region that is visible in the reference image may not be visible in the second image (often referred to as an alternate view image) due to occlusion by a foreground object. When a region from the reference image is occluded in the alternate view image, the depth estimates for that region in the reference image are unreliable as a corresponding region does not exist in the alternate view image. Accordingly, a process that attempts to estimate depth in flat regions using depth estimates from an occluded region (i.e. a region that is not visible in alternate view image(s)) is likely to propagate the errors from the occluded region into at least some of the depth estimates generated for the rest of the flat region. In a number of embodiments, occluded regions are identified and depth estimates from occluded regions are excluded from the process utilized to generate the secondary depth estimates. In this way, highly unreliable depth estimates can be ignored increasing the accuracy of a composite depth map produced using the confident depth estimates from the raw depth map and the secondary depth estimates.

Figure 5B:
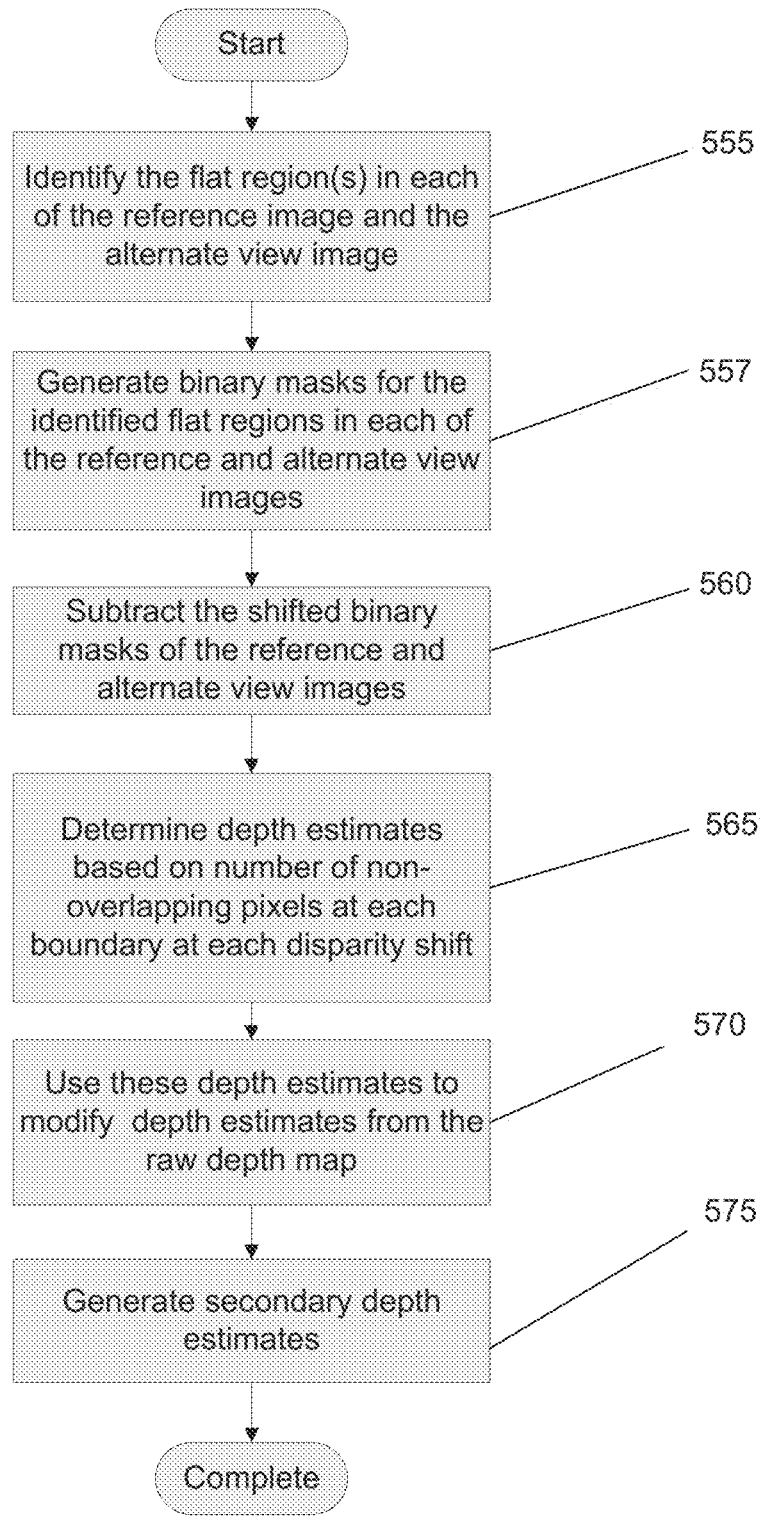
FIG. 5B is a flow chart illustrating a process for obtaining reliable depth estimates at the boundaries of flat regions that may be partially occluded in accordance with an embodiment of the invention.

In several embodiments, portions of flat regions that are occluded can be identified and reliable depth estimates for the portions of the flat regions that are occluded can be obtained by performing an additional depth estimation process such a that shown in FIG. 5B. In a number of embodiments, the depth estimation process involves identifying flat regions and then determining the disparity between the identified flat regions by comparing the locations of the flat regions in the reference image and at least one alternate view image. As noted above, flat regions that are surfaces of foreground objects will have similar shapes in reference and alternate view images (sources of variation can include but are not limited to curvature of the surfaces resulting in different visual hulls). When a flat region is partially occluded by a foreground object, the flat regions will have different shapes in each of the images. In many embodiments, pixels that form an occluded flat region can be utilized to generate a binary mask for each of the reference and alternate view image(s). Subtracting the reference image and an alternate view image at different disparity shifts will yield a binary image showing the extent to which the flat regions to do not overlap at each disparity shift (i.e. each depth that is sampled). When the shift (i.e. the depth that is sampled) corresponds to the actual depth of the flat region within the scene, the non-overlapping regions will be reduced. The presence of occlusions means that the flat regions have different shapes. Therefore, the non-overlapping regions will be minimized at the actual depth of the flat region but likely not eliminated entirely. When approaching the actual depth of the flat region, the non-overlapping regions will form boundaries at the edges of the flat regions. In several embodiments, depth estimates at multiple boundaries of a flat region are obtained by determining the disparity shifts that minimize the non-overlapping portions of the boundary at each of the edges. The edges can be determined by scanning along the direction of the shift to identify distinct non-overlapping regions separated by an overlapping region within the subtracted image. In this way, the process can determine reliable depth estimates at the boundaries of flat regions that do not have uniform depths.

A process for determining reliable depth estimates at the edges of a flat region visible in a reference image and that may be partially occluded in an alternate view image is illustrated in FIG. 5B. The process 550 includes identifying (555) the flat region(s) in each of the reference image and the alternate view image and then generating (557) binary masks for the identified flat regions in each of the reference and alternate view images. A comparison is performed at each of a plurality of disparity shifts (corresponding to discrete depth samples) involving subtracting (560) the shifted binary masks of the reference and alternate view images. The number of non-overlapping pixels at each boundary can then be determined (565) at each disparity shift.

In several embodiments, the reference and alternate view images are rectified so that the rows of the reference and alternate view images correspond to epipolar lines between the two cameras that captured the images. When rectified in this way, the number of non-overlapping pixels associated with a boundary can be determined by summing the non-overlapping pixels in each column. Edges can be identified based upon columns that include a number of pixels below a threshold. Accordingly, the total number of non-overlapping pixels in adjacent columns constituting an edge can be summed. The disparity shift at which the sum is minimized can be utilized as a reliable depth estimate for the pixels at the edge of the flat region. In other embodiments, the number of non-overlapping pixels corresponding to an edge of a flat region can be determined in any of a variety of ways appropriate to the requirements of a given application.

Referring again to the process 550 shown in FIG. 5B, depth estimates for pixels at the edges of the flat region in the reference image can be determined based upon the disparity shift that produces the smallest sum of the non-overlapping pixels at the edge of the flat region. These depth estimates can then be utilized to modify (570) depth estimates from the raw depth map prior to generating (575) the secondary depth estimates in a manner similar to the processes outlined above.

While specific processes for obtaining reliable depth estimates at the edges of flat regions are described above with reference to FIG. 5B, any of a variety of processes that determine reliable depth estimates that can then be utilized as seeds to determine depth estimates for other pixels within a flat region (including processes that involve the use of down sampled images) can be utilized as appropriate to the requirements of a given application.

In several embodiments of the invention, the SGM technique may be modified for handling occlusions with array cameras including three or more cameras by partitioning the array into groups of cameras and computing a separate cost volume for each group, where a reference camera is included in all the groups. For each group, a cost volume with respect to the extent to which pixels from different images at different depths match may be computed from the reference camera point of view. Using SGM, costs can be aggregated for each cost volume in a subset of the directions based on the arrangement of the cameras in each camera group. For instance, if the left half of an array is used as one camera group, then costs can be aggregated from directions that originate from the left side of a pixel. Once costs are aggregated for each camera group, the aggregated cost volumes can be combined. This can be done using various methods, such as (but not limited to) by determining the minimum cost from each camera group for each pixel and depth level, or in a nonlinear manner by summing the matching costs from each camera group if they are below a certain threshold and taking the minimum otherwise.

In SGM, where the data term, or parallax matching cost volume for pixel x at depth d (x being the 2D positional index of a pixel and d being the depth or disparity index), can be indicated by $$C(x,d)$$

and the prior term, or depth smoothness across pixels with similar intensities, can be indicated by $$\sum_{y \in N(x)} P_1 T(|d(x) - d(y)| = 1) + \sum_{y \in N(x)} P_2 T(|d(x) - d(y)| > 1)$$

where $y \in N(x)$ indicates neighborhood of x, and $$T(q) = \begin{cases} 1, & q \text{ is true} \\ 0, & q \text{ is true} \end{cases}$$

the global cost function term is indicated by $$E(d) =$$

$$\sum_x \left[ C(x, d) + \sum_{y \in N(x)} P_1 T(|d(x) - d(y)| = 1) + \sum_{y \in N(x)} P_2 T(|d(x) - d(y)| > 1) \right]$$

Figure 5C:
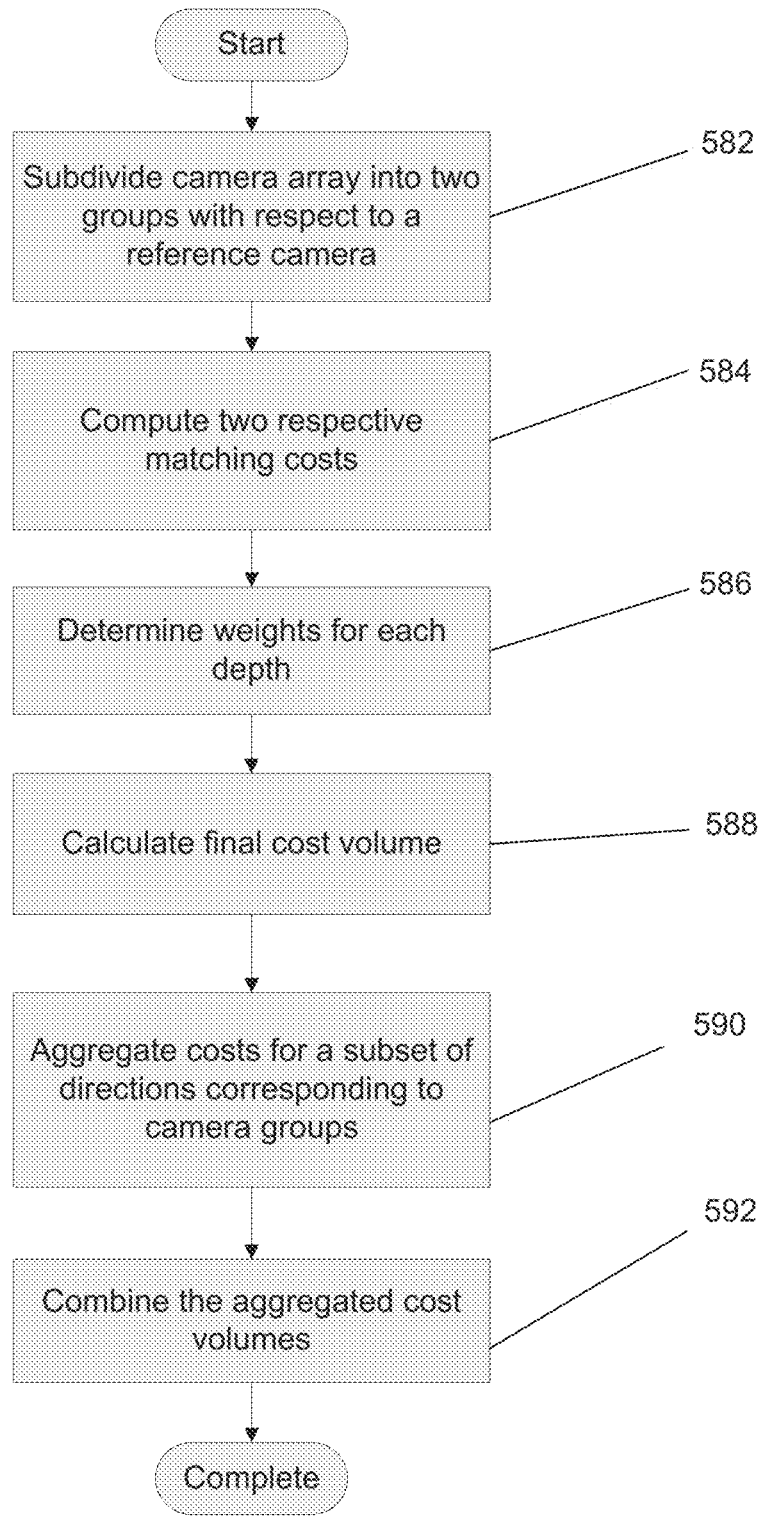
FIG. 5C is a flow chart illustrating a process for obtaining reliable depth estimates in occluded regions of image data from an array camera in accordance with an embodiment of the invention.

FIG. 5C shows a process for obtaining reliable depth estimates in occluded regions of image data from an array camera in accordance with an embodiment of the invention. The process 580 includes occlusion processing performed in two main stages including parallax matching cost computation and dense depth estimation via SGM. In the first stage, to increase the likelihood that the parallax matching cost volume provides useful information in occlusion zones, the camera array can be subdivided (582) into two groups $G_1$ and $G_2$ with respect to a reference camera. Two respective matching costs $C_1$ and $C_2$, may then be computed (584), where $$C_i(x, d) = \sum_{n \in G_i} |I_{ref}(x) - I_n(x - \delta_n(d))|$$

where $\delta_n(d)$ indicates the parallax-induced shift for camera n at depth d.

Weights may be determined (586) for each depth as $$\alpha_i(x, d) = \begin{cases} \dfrac{b_i}{\sum_j b_j}, & C_i(x, d) < \gamma(I_{ref}(x)), \forall i \\ 1, & C_i(x, d) = \min_j(C_j(x, d)) \\ 0, & \text{otherwise} \end{cases}$$

where $b_i$ is the largest baseline in sub-group $G_i$ and $\gamma$ is a threshold based on the intensity $I_{ref}(x)$ of the reference pixel at x.

The final cost volume may then be obtained (588) as $$C(x,d) = \alpha_1(x,d) * C_1(x,d) + \alpha_2(x,d) * C_2(x,d)$$

where $\alpha_1 + \alpha_2 = 1$.

In many embodiments of the invention, SGM may then be employed to handle occlusions using direction partitioning.

In the generic version of SGM, energies from all directions are summed. As an example and not by way of limitation, assuming eight directions 0-7, $$E(x, d) = \sum_{k=0}^{7} E_k(x, d)$$

where $\hat{d}(x) = \underset{d}{\mathrm{argmin}} E(x, d)$.

Figure 5D:
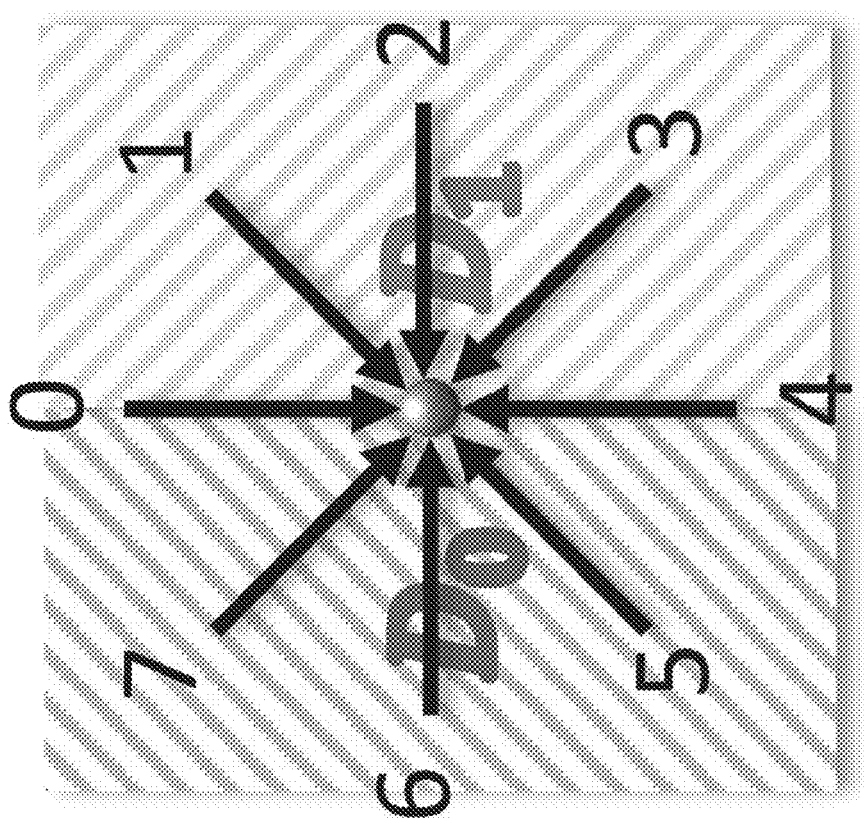
FIG. 5D shows an example of direction partitioning in accordance with an embodiment of the invention.

With direction partitioning in accordance with some embodiments of the invention, the SGM technique may be modified to aggregate (590) costs for a subset of directions corresponding to camera groups, and then combining (592) the aggregated cost volumes. As an example and not by way of limitation, assuming eight directional partitions 0-7 such as that shown in FIG. 5D, where $$D_0 = \{0,1,2,3,4\}$$

$$D_1 = \{0,4,5,6,7\}$$

the minimum energy may be chosen from $D_0$ and $D_1$. Thus, $$E^i(x, d) = \sum_{k \in D_i} E_k(x, d)$$

where $$E(x, d) = \min_i E^i(x, d)$$

$$\hat{d}(x) = \underset{d}{\mathrm{argmin}} E(x, d)$$

While the above discussion assumes use of SGM across 8 directions, as can readily be appreciated any number of directions can be utilized and the directions partitioned in a manner appropriate to the relative locations of the cameras within a camera array. In a number of embodiments of the invention, the above method can provide improved depth estimates in occluded regions with small memory overhead for performing cost comparison. High costs due to occlusions can occur in a predictable direction from a depth edge based on the camera arrangement, so this knowledge may be used in cost aggregation with SGM or other optimization methods. Further, the cost volume may automatically incorporate the best matching costs for all occluded regions. In many embodiments, methods similar to those described above can utilize vectorization, and thus it is possible to perform optimization using vector instructions on a CPU.

In an alternative embodiment of the invention, separate costs (e.g., $C_1$ and $C_2$) may be retained for each sub-group, and two energy terms may be obtained using $C_i$ based on a direction partition. In other embodiments of the invention, alternatives for handling visibility in parallax matching may include, for example but not by way of limitation, accepting only the minimum cost at each depth, accepting the entire cost cube ci (x) for the sub-group with the least minimum cost at each x, or accepting the entire cost cube for a sub-group that estimates a background depth. Processes for determining subgroups with minimum costs that can be utilized in accordance with various embodiments of the invention are described in U.S. Pat. No. 8,619,082, the relevant disclosure from which including the disclosure related to estimation of depth using subsets of images obtained by an array of cameras is incorporated by reference herein in its entirety.

Figure 5E:
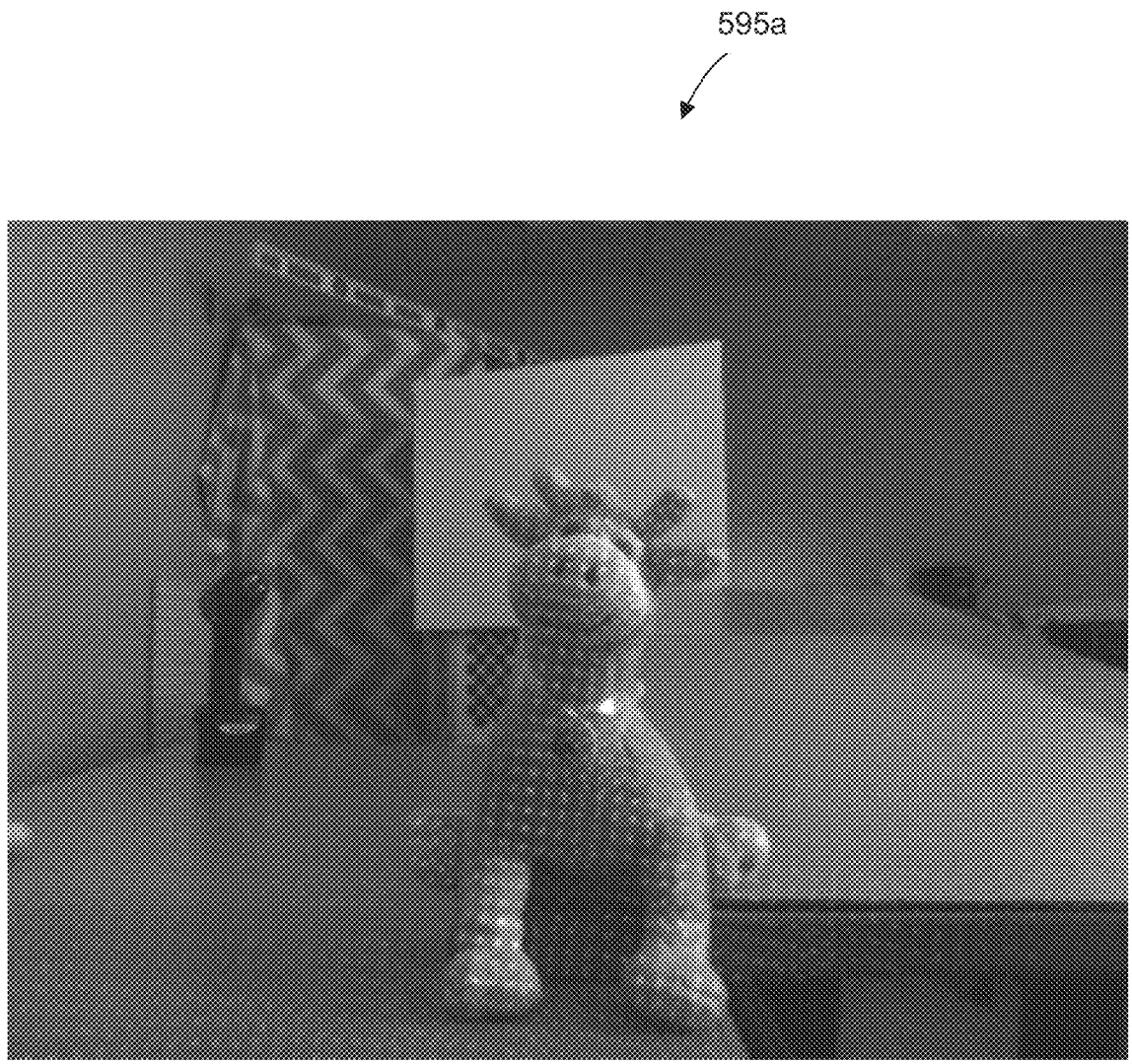
FIG. 5E shows a captured image in accordance with an embodiment of the invention.
Figure 5F:
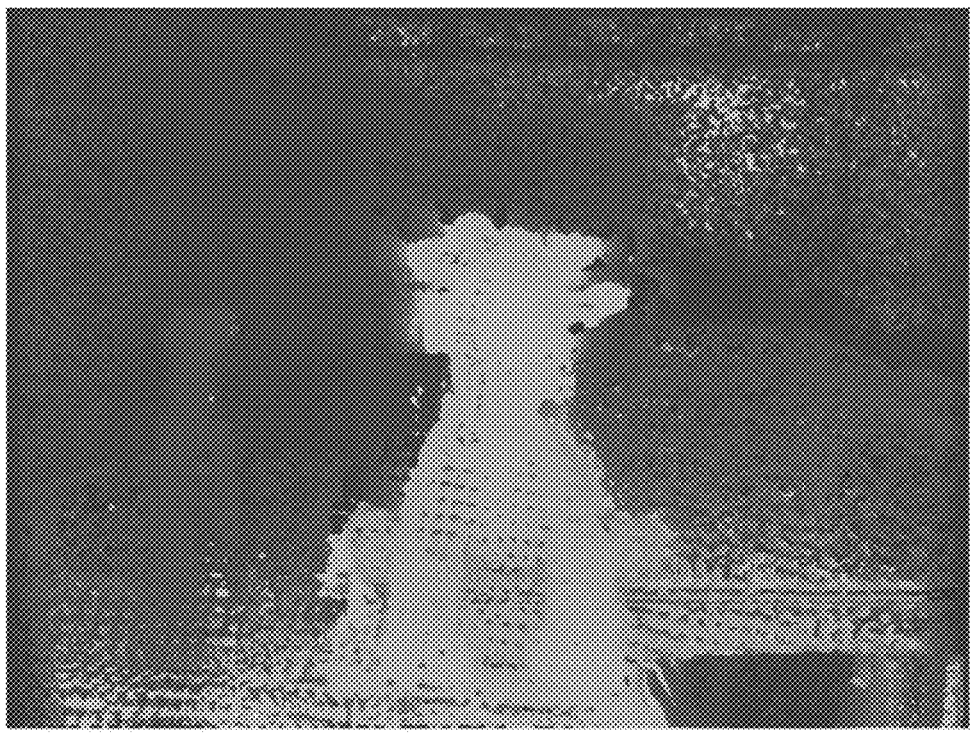
FIG. 5F shows a raw depth map and a regularized depth map for the captured image of FIG. 5E, using a generic SGM technique in accordance with an embodiment of the invention.
Figure 5F:
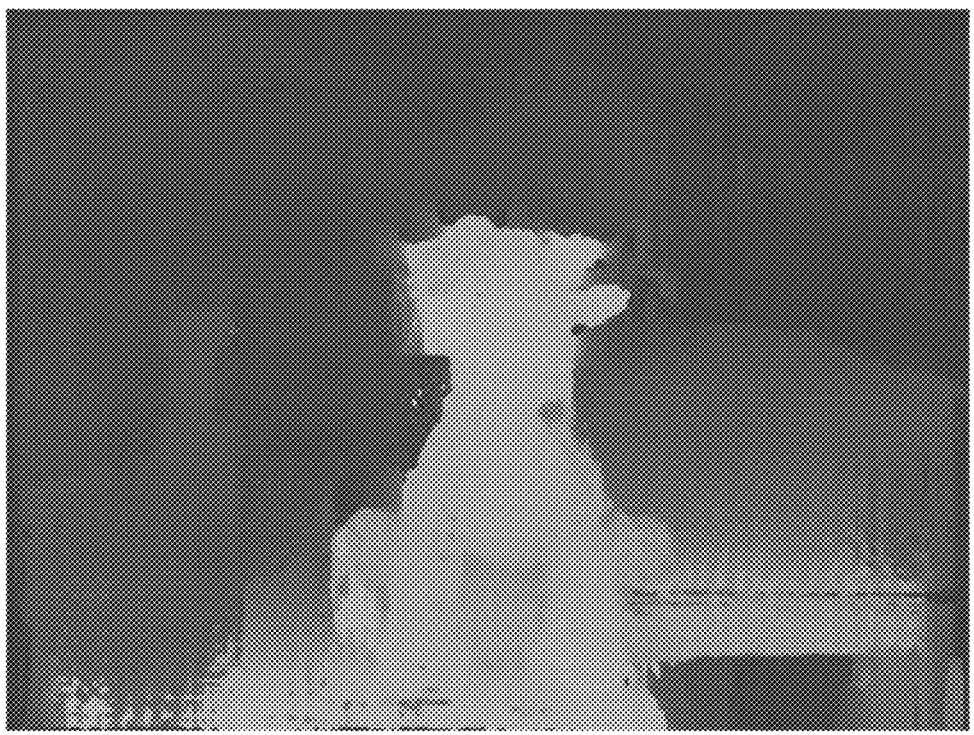
Figure 5G:
FIG. 5G shows a raw depth map and a regularized depth map for the captured image of FIG. 5E, using SGM with occlusion handling in accordance with an embodiment of the invention.
Figure 5G:

FIG. 5G illustrates examples of a raw depth map 595d and a regularized depth map 595e for a captured image 595a (shown in FIG. 5E) using SGM with occlusion handling in accordance with an embodiment of the invention. As compared to the raw depth map 595b and the regularized depth map 595c of FIG. 5F created using a generic SGM implementation for the same captured image 595a, it can be observed that depth estimation at occluded regions are considerably improved with depth bleeding reduced using with occlusion handling.

While specific processes for handling occlusions in image data from array cameras are described above with reference to FIGS. 5C-5G, any of a variety of processes that providing depth estimates in occluded regions from an array camera configuration can be utilized as appropriate to the requirements of a given application. Furthermore, although specific processes are described above for a first phase of a hybrid depth regularization process with reference to FIG. 5A, any of a variety of processes can be utilized appropriate to the requirements of a specific application in accordance with embodiments of the invention. Processes for the second phase of a hybrid depth regularization process in accordance with various embodiments of the invention are discussed further below.

Phase 2: Textured Regions

In a second phase of hybrid depth regularization processes according to several embodiments of the invention, noise can be removed from the depth map and depth discontinuities subsequently detected. Noise may come from parallax errors as discussed above, artifacts from the secondary depth estimation process such as but not limited to the process utilized to generate the secondary depth estimates (e.g. SGM), and disjoint composition in the first phase. Confident depth estimates can also be noisy due to errors in estimating confidence itself. Further, for the purpose of depth edge detection, it may be desirable to remove noise to avoid false detections. Since depth information is often very low frequency except for depth discontinuities, some embodiments of the invention may over-smooth in order to improve performance, with depth discontinuities being treated independently.

Figure 6:
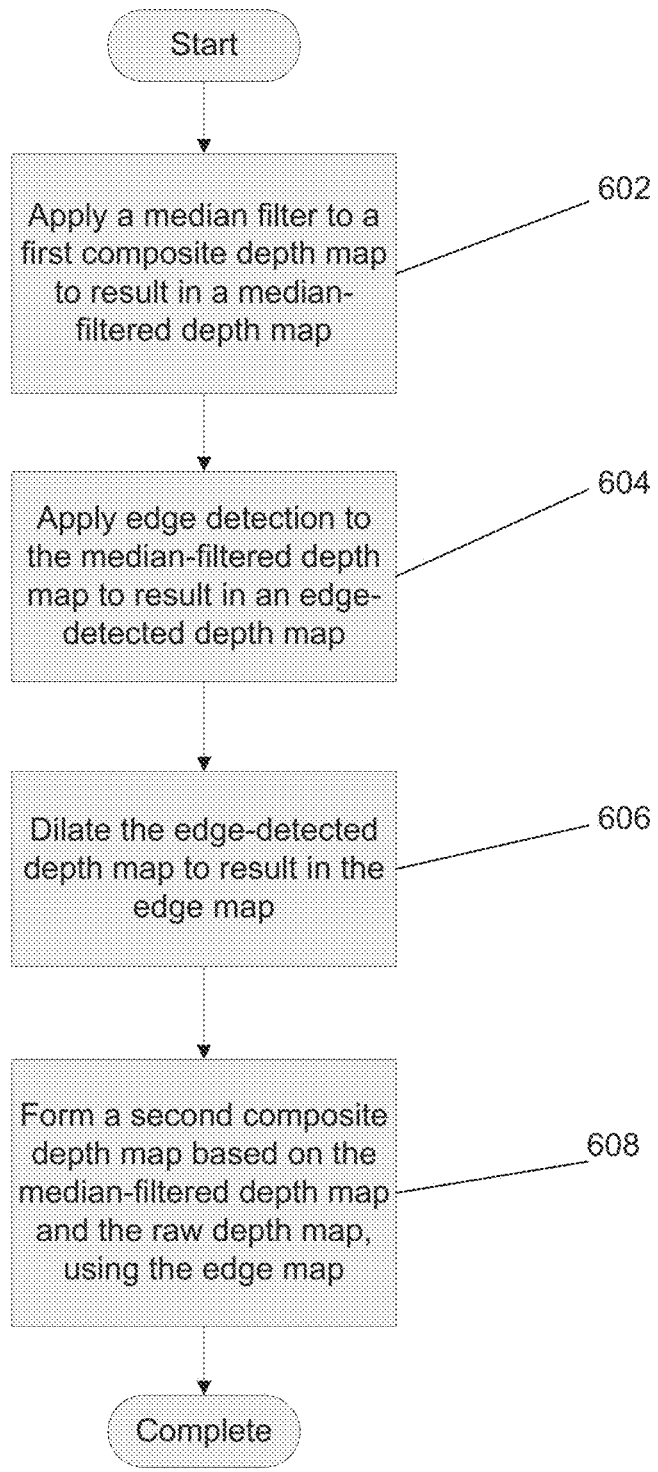
FIG. 6 is a flow chart illustrating a process for computing a second composite depth map in accordance with an embodiment of the invention.
Figure 7:
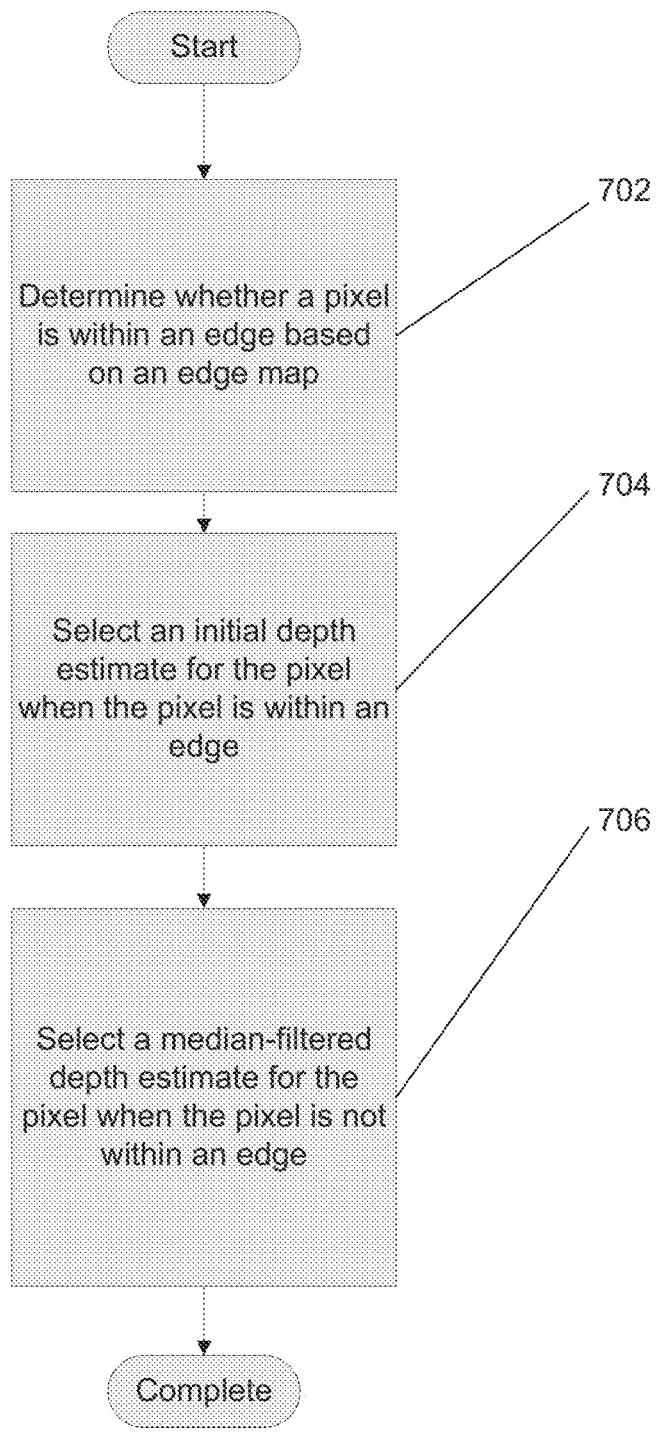
FIG. 7 is a flow chart illustrating another process for computing a second composite depth map in accordance with an embodiment of the invention.

Receiving a first composite depth map as an input from the first phase, the second phase may compute a second composite depth map using a process similar to the process 600 shown in FIG. 6. A median filter may be applied (602) to the first composite depth map, resulting in a median-filtered depth map. Edge detection may then be applied (604) to this median-filtered depth map to result in an edge-detected depth map. This edge-detected depth map may be dilated (606) to form an edge map. The dilation process can involve determining a region surrounding edges in the edge map. In many instances, depth estimates proximate edges of foreground objects can be unreliable due to the portion of the scene visible next to the edge in the reference image being occluded in an alternate view image. As is discussed further below, the unreliability of these depth estimates can lead to bleeding of depth from the reliable depth estimates of the foreground object. Therefore, dilating the edge map enables identification of pixels proximate an edge that may suffer from edge bleeding of high confidence depth estimates and avoid their being processed during the median-filtering of the first composite depth map. In many embodiments, the edge map is used to form (608) a second composite depth map based on the median-filtered depth map and the raw depth map, using the edge map.

Where the raw depth map includes initial depth estimates, and the median-filtered depth map includes median-filtered depth estimates, the second composite depth map may be further formed using a process 700 shown in FIG. 7 according to certain embodiments of the invention. It may be determined (702) whether a pixel is within an edge based on the edge map. If so, the initial depth estimate may be selected (704) for the pixel; if not, the median-filtered depth estimate may be selected (706) for the pixel.

As an example and not by way of limitation, the input first composite depth map from the previous phase may be filtered with a filter such as (but not limited to) 9×9 median filter. Sobel edge detection may be applied, followed by dilation with a 5×5 box structural element. The resulting binary mask may indicate pixels that should be processed by the third and final phase of the regularization process. According to some embodiments of the invention, dilating the edge map to obtain the binary mask can enable correction of depth bleeding, or the misalignment of depth and image edges. As noted above, depth bleeding often manifests as the assignment of foreground depth to pixels in the background beyond the boundary of the occluding object. Depth bleeding may occur due to cost aggregation in the parallax stage and median filtering in the present phase of depth regularization. Thus, the edge map may be dilated in order to assign pixels in the neighborhood of an edge, whose estimates are not necessarily reliable, to be processed using bilateral filtering in a subsequent phase.

In certain embodiments of the invention, the dilation element may be set to half of the median window size so that bleeding on either side of the detected depth edge is accounted for. Increasing the median window size can lower the number of edges that are detected, but the increased size of the requisite dilation element can balance this effect by widening the region of each detected edge. Thus, the total number of pixels in the mask remains roughly constant with median window size. As can readily be appreciated, any of a variety of techniques for detecting edges and for dilating an edge mask on either side of an edge can be utilized as appropriate to the requirements of a given application in accordance with various embodiments of the invention.

Once the binary mask denoting depth edges is obtained, the second composite depth map can be formed from the median-filtered and raw depth maps, using the depth edge binary mask to select the source of the depth estimate to utilize within the second composite depth map. This composition paints in the raw estimates in areas that are yet to be regularized in the next phase, and uses the median filtered values (from the secondary and confident initial depth estimates) everywhere else.

Although specific processes are described above for a second phase of a hybrid depth regularization process with reference to FIGS. 6-7, any of a variety of processes can be utilized appropriate to the requirements of a specific application in accordance with embodiments of the invention. Processes for regularizing depths around edges (i.e. depth discontinuities in depth maps) utilized within hybrid depth regularization process in accordance with various embodiments of the invention are discussed further below.

Phase 3: Depth Discontinuities

In many embodiments, the hybrid depth regularization process separately processes regions of the image which contain relatively large changes in depth (often referred to as depth discontinuities). These areas generally contain the high-frequency content of the depth map and may require heavy processing to enforce luminance-depth edge correlation therein.

Figure 8:
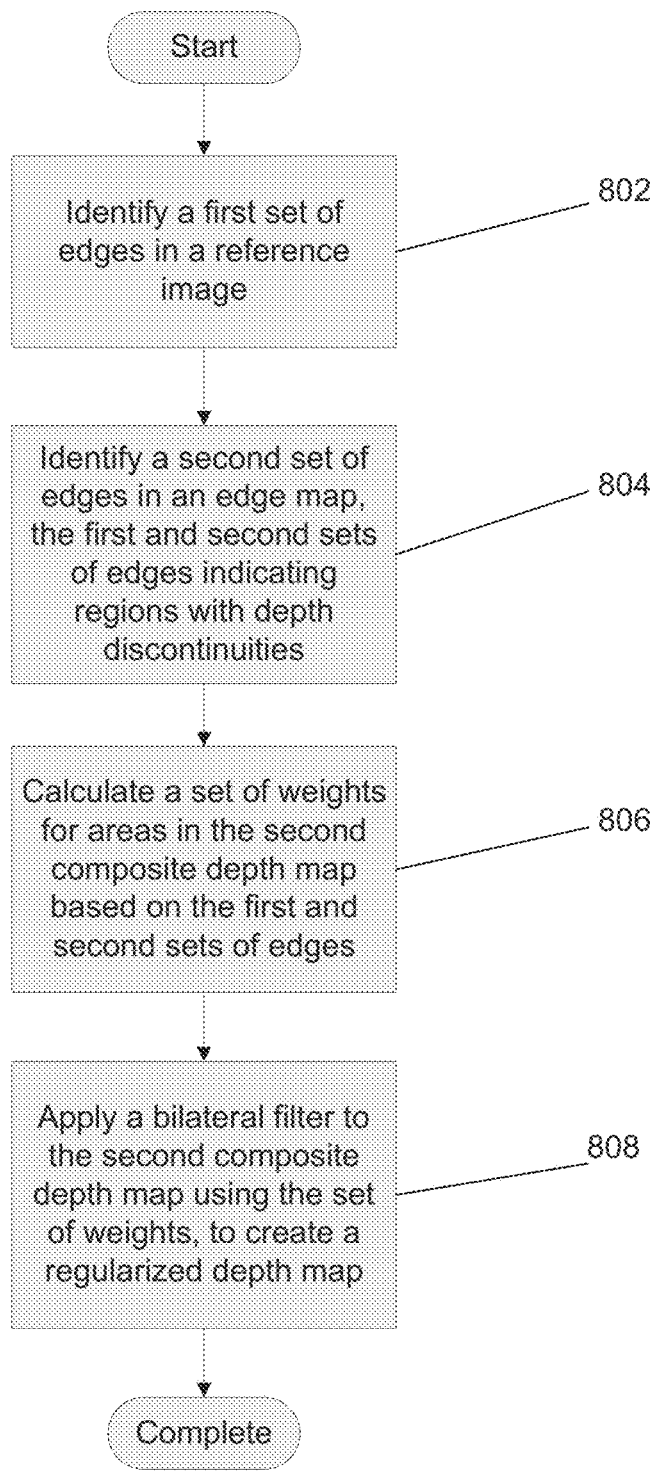
FIG. 8 is a flow chart illustrating a process for creating a regularized depth map in accordance with an embodiment of the invention.

In a number of embodiments, a depth map that has already been processed to regularize depth estimates in various regions of the depth map such as (but not limited to) the second composite depth map generated using processes similar to the processes described above with reference to FIGS. 7 and 8 can be utilized as an input to a process 800 that perform depth regularization in regions surrounding depth discontinuities. As shown in FIG. 8, a first set of edges may be identified (802) in the reference image, and a second set of edges identified (804) in the edge map. These first and second sets of edges can indicate regions with depth discontinuities. A set of weights may then be calculated (806) for areas in the second composite depth map based on the first and second sets of edges. These weights indicate the similarity of the depth and intensity and/or color information between a pixel and its surrounding pixels. Using the calculated set of weights, an edge preserving filter such as (but not limited to) a bilateral filter may be applied (808) to the second composite depth map, to create the final regularized depth map.

As an example and not by way of limitation, to accomplish the edge alignment, a joint bilateral weighted median filter may be used. The bilateral weights computed from the image may allow for image domain edge-guided filtering on the depth map. Choosing the median value based on these weights may provide robustness to noise from the underlying raw depth estimates and further preserve edges. Techniques may be employed from Z. Ma, K. He, Y. Wei, J. Sun, and E. Wu, "Constant time weighted median filtering for stereo matching and beyond," in 2013 IEEE International Conference on Computer Vision, pp. 49-56, December 2013, the relevant disclosure of which is hereby incorporated by reference.

The bilateral filter window size may be set to, for example, 17×17, about twice the median window size from the example in the above section. This may be done so that when the window is centered on the depth edge, its region of support will still include about 50% of previously filtered, non-noisy data. Other parameters, such as the range and domain standard deviations used in Gaussian weights, may be determined empirically.

In some embodiments of the invention, the median and/or other statistics are computed at a lower resolution to reduce computation. The statistics of the depth measurement in a given window may not change significantly with resolution, so it is possible for a high-resolution estimate to be computed at depth edge pixels without analyzing every pixel in the window. For example, in a 17×17 window, the median may be computed based on ¼ of the 289 pixels in the window. This may provide for significant increase in computational speed while sacrificing little depth quality.

In many instances, 10-20% of pixels are processed in this phase. However, due to large window sizes, pixel weight computation, and number of memory accesses, the computations from this phase may be an expensive part of the overall depth regularization process. The alignment of depth and image edges provided by this phase may be significant for applications such as adding bokeh effects and inserting virtual objects into a scene.

Although specific processes involving specific types of edge preserving filters are described above for a final phase of a hybrid depth regularization process with reference to FIG. 8, any of a variety of processes including any of a variety of techniques for smoothing noise while preserving depth discontinuities can be utilized as appropriate to the requirements of specific applications in accordance with various embodiments of the invention. Results of various hybrid depth regularization processes in accordance with embodiments of the invention are discussed further below.

Results

An example of results obtained performing a hybrid depth regularization process in accordance with an embodiment of the invention is illustrated in FIGS. 4A-4I, which show various intermediate computational products obtained during various phases of the hybrid depth regularization process. FIGS. 4A-4I show the inputs, intermediate results, and final output of real-time hybrid depth regularization for the data set. The scene consists of a textured tabletop receding in depth, three fronto-parallel boxes on top of it at different distances, and a largely untextured background. The normalized reference image 400, also reveals that an infrared (IR) pattern was projected across the scene, though it appears faint in the background. In this particular example, the bottom approximately 10% of the images in FIGS. 4A-I may be ignored. This is a region lacking field-of-view overlap between the cameras in the array, so the data here may be considered meaningless.

The raw depth map 410 from the parallax stage of the pipeline is the initial depth map upon which hybrid depth regularization seeks to improve. It can be seen that estimates in textured regions appear plausible, while estimates in most other places are noisy and the depth in the large background region is erroneous. The confidence map 420, also from the parallax stage of the pipeline, marks pixels where the raw depth estimate is believed to be reliable. The three images in FIGS. 4A-4C, along with the cost volume from the parallax stage (not pictured), form inputs to a first phase of the hybrid depth regularization.

Figure 4D:
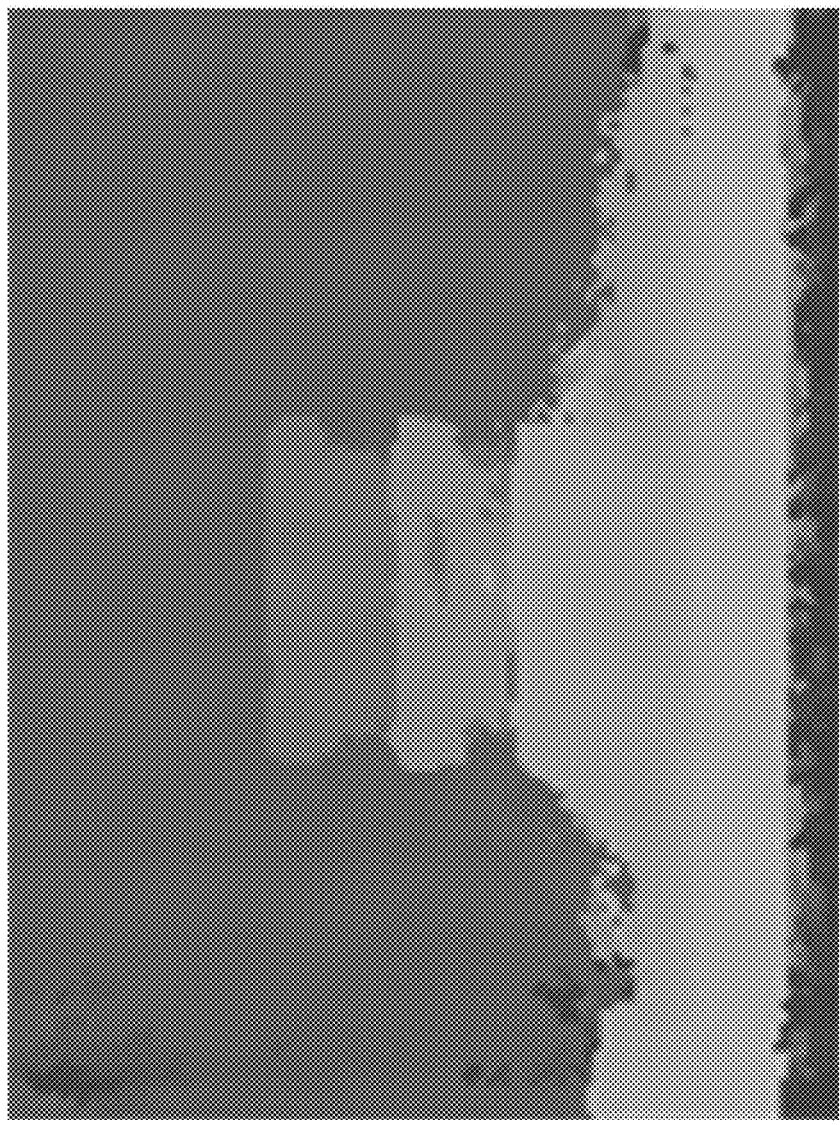
FIG. 4D shows a depth map with secondary depth estimates using semi-global matching (SGM) in a hybrid depth regularization process in accordance with an embodiment of the invention.
Figure 4E:
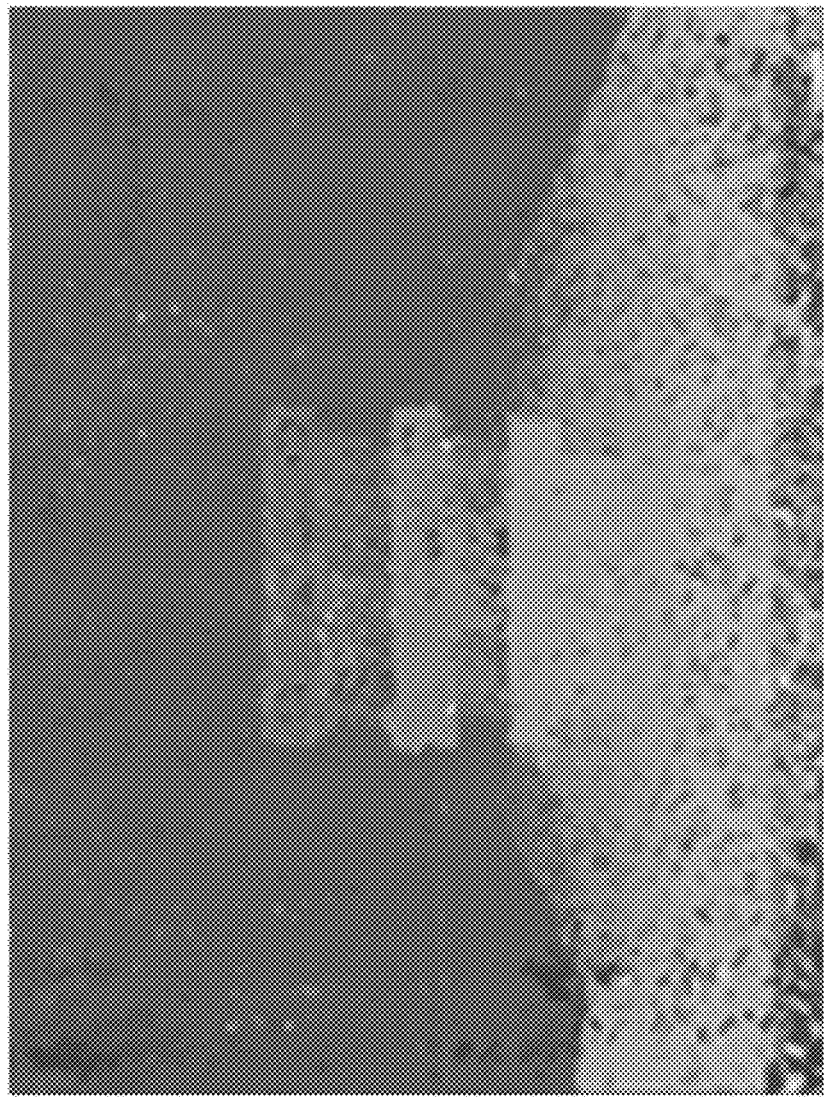
FIG. 4E shows a first composite depth map in a hybrid depth regularization process in accordance with an embodiment of the invention.

FIG. 4D shows an example of a set of secondary depth estimates 430 as output (and upsampled) from processing using an SGM technique similar to the SGM processes described above. While the depth may be considered insufficiently formed around the boxes and the distant parts of the tabletop, it has achieved its purpose of providing consistent estimates in the flat background region. Some streaking artifacts have been introduced into the background, which is typical of SGM in flat regions. The output from the first phase, the first composite depth map 440, is more consistent than the raw depth map 410.

Figure 4F:
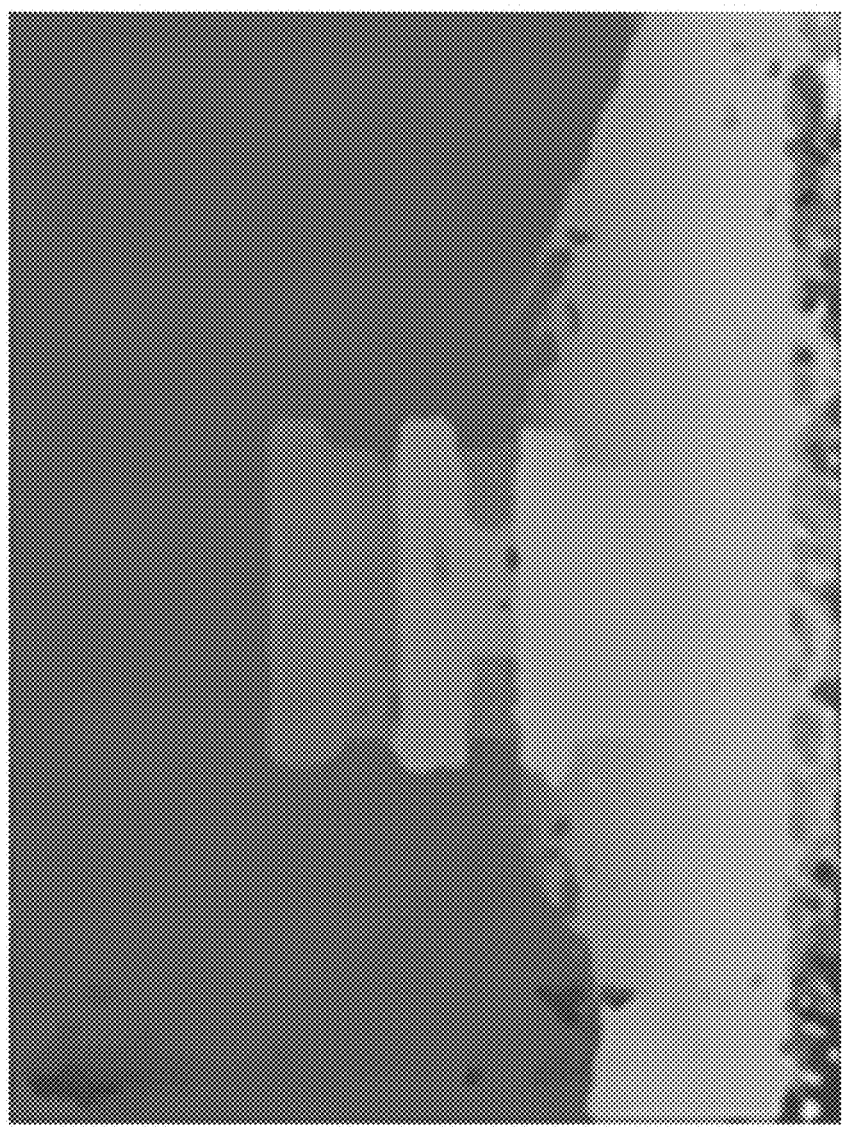
FIG. 4F shows a median-filtered depth map in a hybrid depth regularization process in accordance with an embodiment of the invention.
Figure 4G:
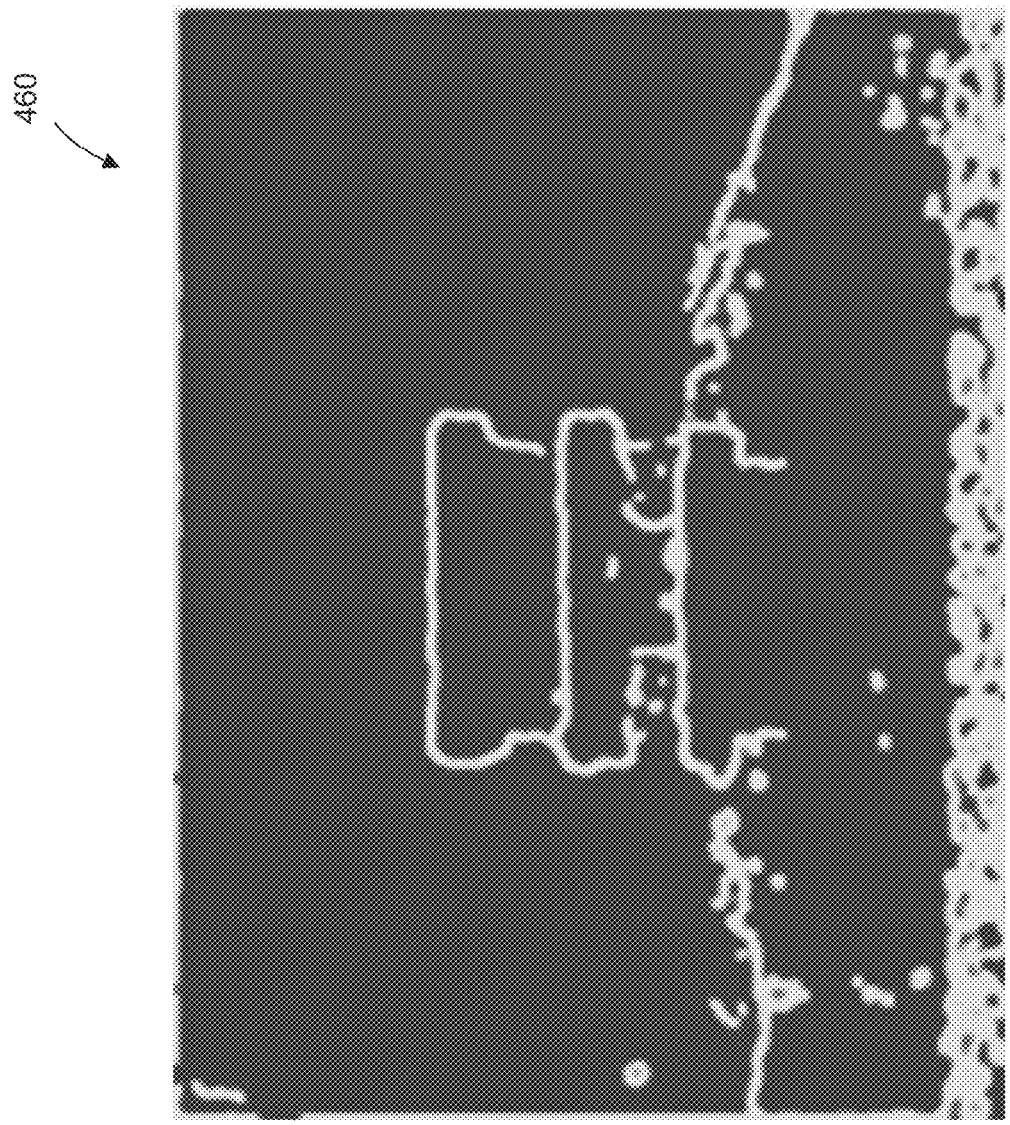
FIG. 4G shows a binary edge map of depth discontinuities in a hybrid depth regularization process in accordance with an embodiment of the invention.
Figure 4H:
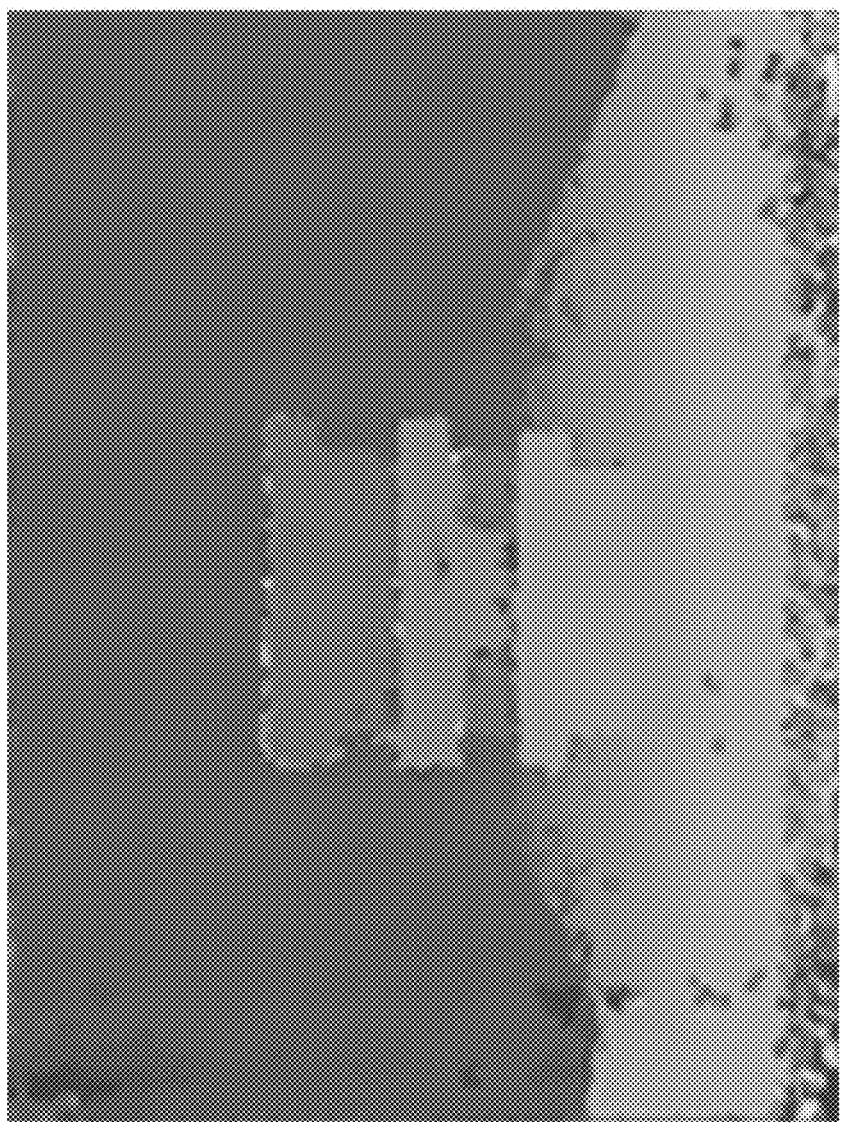
FIG. 4H shows a second composite depth map in a hybrid depth regularization process in accordance with an embodiment of the invention.

The result of median filtering the output from the first phase is shown in FIG. 4F. In this median-filtered depth map 450, much of the noise has been removed and the artifacts from SGM have been mitigated. The binary map of depth edges 460, obtained by edge detection on the median-filtered depth map followed by a dilation, is shown in FIG. 4G. In this example, most depth edges have been reliably detected with few false positives. The edges of the boxes and table have been marked, and the gradual recession of the table has been ignored. It can be observed here the importance of the median filter for noise reduction, as edge detection on FIG. 4E (prior to median filtering) typically contains more false positives. The output of the second phase, a second composite depth map 470 formed from FIGS. 4B, 4F and 4G, is shown in FIG. 4H. This result has much less noise than the first composite depth map 440 of FIG. 4E.

Figure 4I:
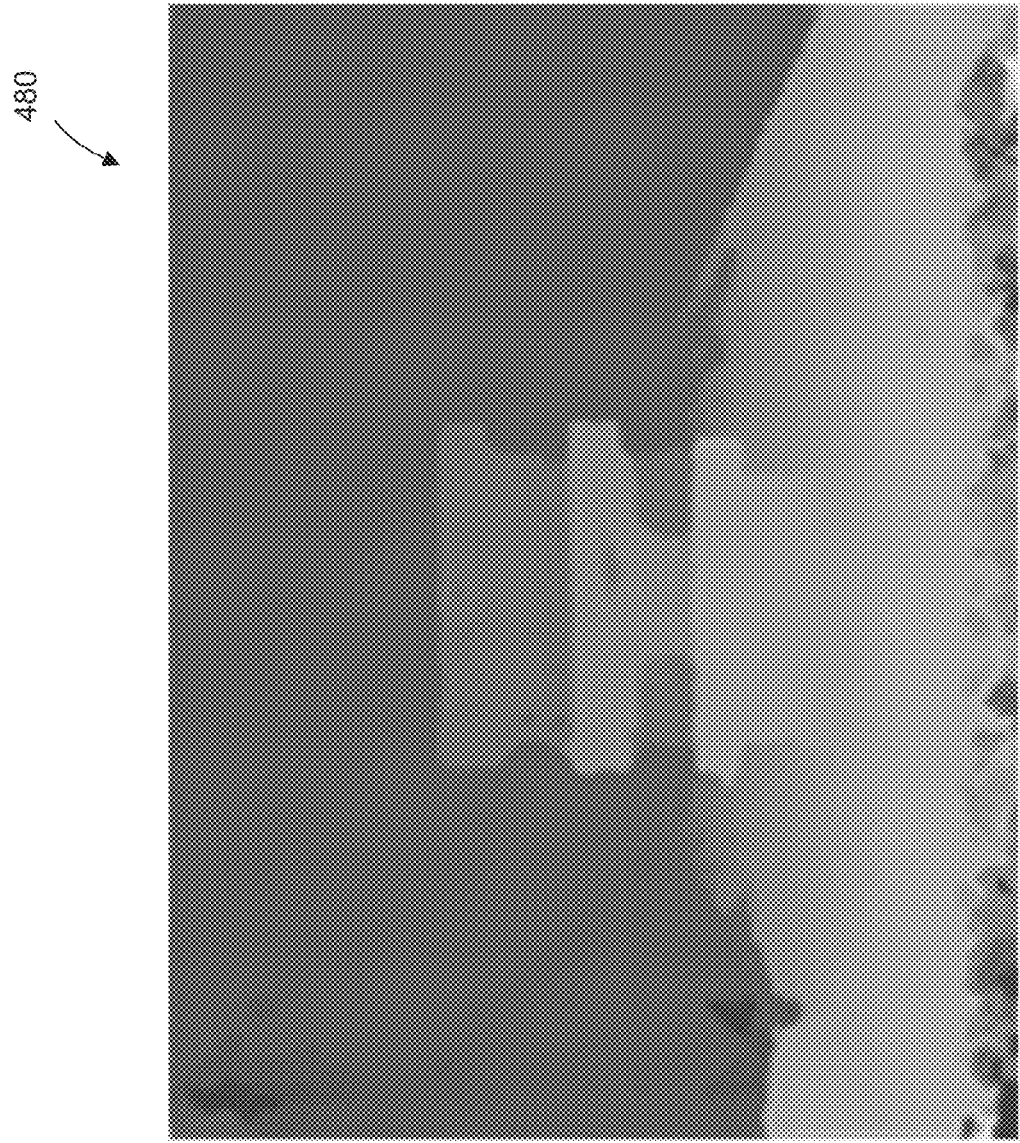
FIG. 4I shows a final regularized depth map in a hybrid depth regularization process in accordance with an embodiment of the invention.

In the final phase, the second composite depth map output from the second phase is filtered at pixel locations defined by positive values in edge map 460. The final regularized depth map 480 is shown in FIG. 4I. The bilateral filter primarily enforces edge consistency between the image and depth map, which may be considered a main difference between median-filtered depth map 450 and the final output 480. It may also correct errors due to false positives in the depth edge detection, as can be observed in comparing the final output 480 with that of the second composite depth map 470, the first composite depth map 440, and the original raw depth map 410.

Although specific inputs, intermediate results, and final outputs are described above for one particular implementation of a hybrid depth regularization process with reference to FIGS. 4A-4I, any of a variety of results may be observed in the implementation of processes appropriate to the requirements of a specific application in accordance with embodiments of the invention. Systems for performing hybrid depth regularization in accordance with embodiments of the invention are discussed further below.

Systems for Performing Hybrid Depth Regularization

Systems for performing hybrid depth regularization in accordance with various embodiments of the invention can be located anywhere within a network. As noted above, the techniques for performing hybrid depth regularization are particularly effective with respect to improving depth map quality, and thus 3D displays, in AR contexts with stereo camera configurations. Accordingly, the cameras that capture the images can themselves be configured via software as image processing systems capable of performing hybrid depth regularization on captured images either automatically and/or at the direction of the user. In a number of embodiments, images and/or 3D environments can be shared over networks using a number of different communication techniques including (but not limited to) a synchronized content management system (i.e. a server that automatically coordinates the copying of images from one device to another) in the context of, for example, online multi-player games. In many embodiments, a server that receives stereo images captured by cameras can be configured by software to perform hybrid depth regularization. As can readily be appreciated, almost any computing device within a network can be configured to perform perspective distortion correction as appropriate to the requirements of specific applications in accordance with various embodiments of the invention.

Figure 9:
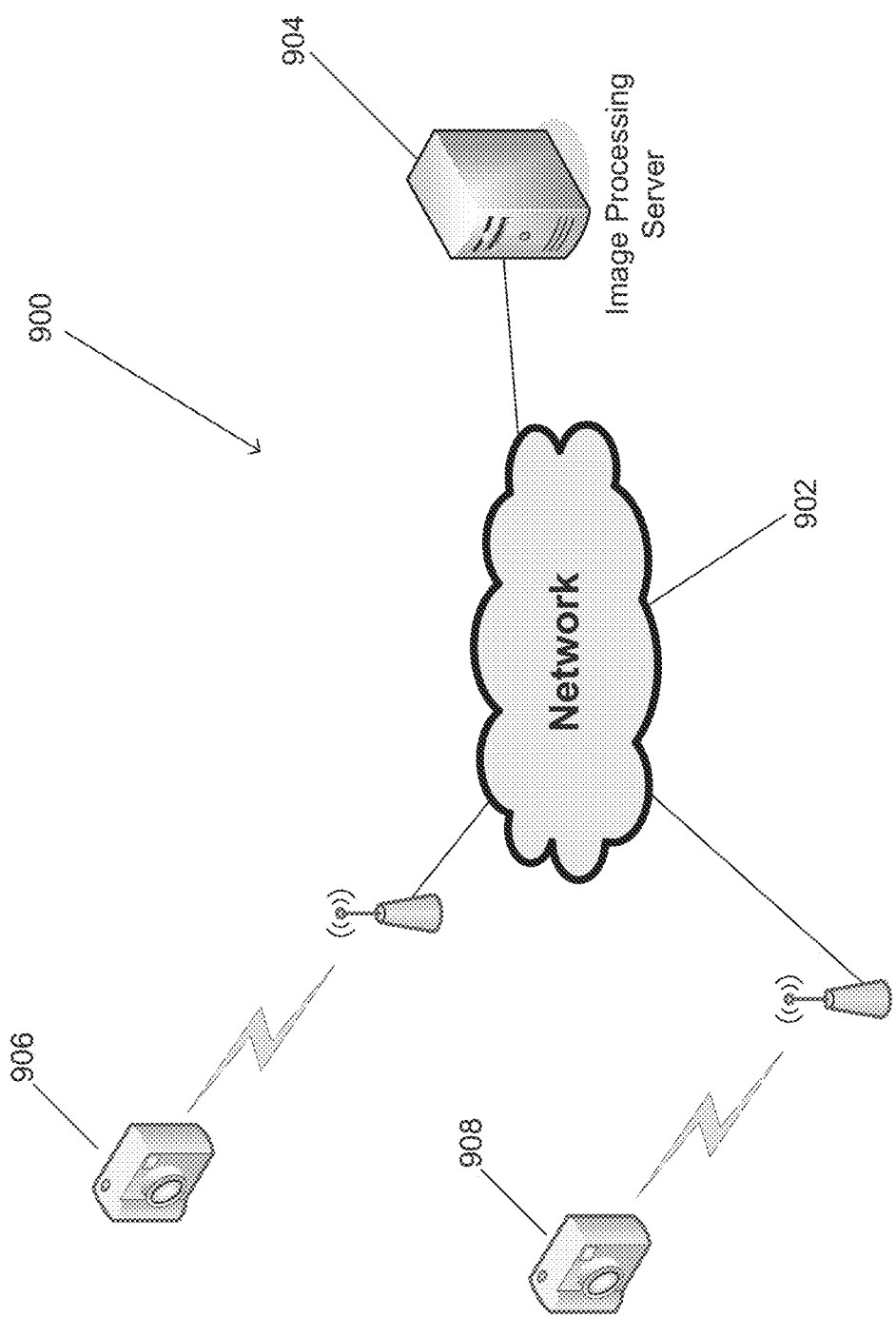
FIG. 9 conceptually illustrates a system including image processing systems configured to perform hybrid depth regularization in accordance with an embodiment of the invention.

Computing devices configured to capture images and perform hybrid depth regularization in accordance with various embodiment of the invention are illustrated in FIG. 9. The system 900 includes a number of cameras 906 and 908 configured to capture image data and corresponding depth map data. Although separate cameras are illustrated, one can readily appreciate that any device for capturing two or more images of a scene from different viewpoints, such as but not limited to a mobile phone handset, a web cam, and/or a headset or goggles with two cameras, can be utilized to capture, transmit, and/or process images in accordance with several embodiments of the invention. The cameras 906 and 908 may include two similar cameras, one color and one black-and-white camera, the black-and-white camera may also image within at least a portion of the near infrared spectrum, two similar cameras with different fields of view, and/or any other configuration of cameras capable of capturing stereo images. Furthermore, depth regularization processes similar to those described above can be applied to depth maps using a single moving camera and/or any of a variety of other camera systems that can capture depth information and image data.

The cameras 907 and 908 can transmit the image data and depth map data to an image processing server 904 via a network 902. Any of the computing devices within the system 900 can potentially be utilized to perform hybrid depth regularization. In a number of embodiments, the cameras 906 and 908 (or device encompassing both cameras) include software that configures the cameras to perform hybrid depth regularization on images captured or stored by the cameras. In several embodiments, the image processing server 904 can perform hybrid depth regularization on images received from cameras. The final regularized depth map, and/or display created using the regularized depth map, may be transmitted directly or indirectly to a display within the server 904, or remotely to other devices such as but not limited to a headset or other device including the camera array.

Figure 10:
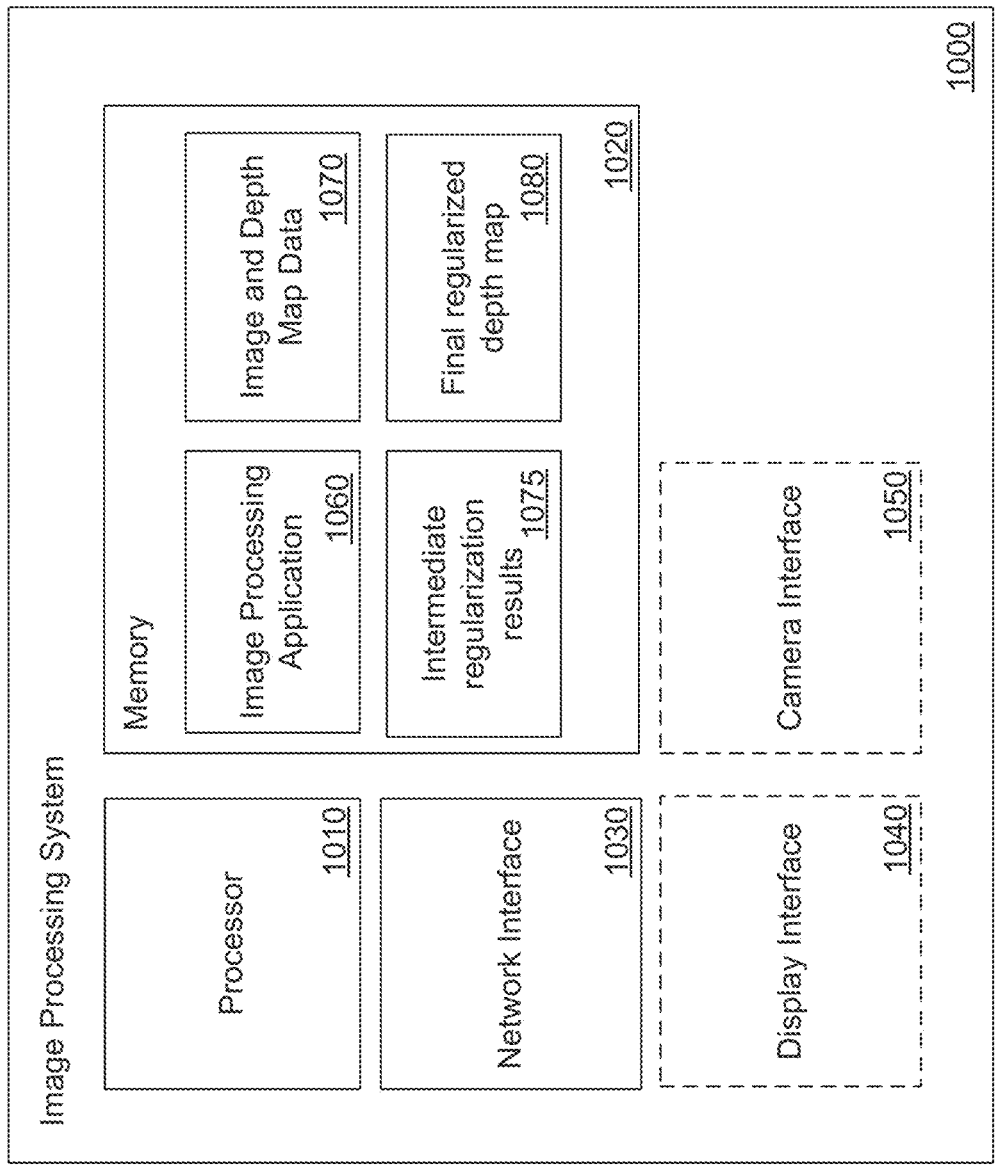
FIG. 10 conceptually illustrates an image processing system configured to perform hybrid depth regularization in accordance with an embodiment of the invention.

An image processing system that can be utilized to automatically perform hybrid depth regularization in accordance with an embodiment of the invention is illustrated in FIG. 10. The image processing system 1000 includes a processor 1010, memory 1020, a network interface 1030, an (optional) display interface 1040, and an (optional) camera interface 1050. Servers typically will not require a display interface or a camera interface and many computing devices that include displays do not include camera interfaces. The memory 1020 includes an image processing application 1060, image and depth map data 1070, intermediate regularization results 1075 and a final regularized depth map 1080. The image processing application can configure the processor to perform hybrid depth regularization using any of the techniques described above to produce a regularized depth map for use in 3D displays.

Although specific image sharing systems and image processing systems are described above with reference to FIGS. 9 and 10, any of a variety of computing devices can be utilized to acquire, share, and/or perform hybrid depth regularization on images as appropriate to the requirements of specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A depth sensing system, comprising:
   at least one camera;
   a processor;
   a display;
   a memory containing an image processing application;
   wherein the image processing application directs the processor to:
      obtain image data for a plurality of images of a scene from multiple viewpoints using the at least one camera, wherein the image data for the plurality of images comprises a reference image and at least one alternate view image;
      generate a raw depth map and a confidence map based upon observed parallax between the image data for the reference image and the image data for the at least one alternate view image, where:
         the raw depth map contains depth estimates for pixels within the reference image; and
         the confidence map indicates reliability of depth estimates contained within the raw depth map;
      identify depth estimates in the raw depth map that are unreliable;
      ignore the depth estimates in the raw depth map that are identified as unreliable to obtain reliable depth estimates from the raw depth map;

generate a regularized depth in real time by applying a filter to the reliable depth estimates from the raw depth map, where the filter:
    determines depth based upon reliable depth estimates from the raw depth map when the confidence map indicates the depth estimates is highly reliable; and
    determines depth based upon a bilateral weighted filter that provides edge guided filtering of the reliable depth estimates from the raw depth map when the confidence map indicates the depth estimate is unreliable, where the bilateral weighted filter:
        determines depth values representative of windows of pixels; and
        applies a bilateral filter to the determined depth values representative of windows of pixels, where weights of the bilateral filter are based upon pixel proximity and similarity of intensity;
insert a virtual object into the scene based upon the regularized depth map;
render an image of the scene including the virtual object; and
display, in real time via the display, the image of the scene including the virtual object.

2. The depth sensing system of claim 1, wherein the image processing application directs the processor to generate the raw depth map by determining a cost volume, where the cost volume indicates matching costs for pixels in the reference image at different depth samples based upon the at least one alternate view image.

3. The depth sensing system of claim 2, wherein the image processing application directs the processor to obtain reliable depth estimates from the raw depth map by performing Semi Global Matching (SGM) using the reference image and the cost volume to produce secondary depth estimates.

4. The depth sensing system of claim 3, wherein the image processing application directs the processor to performing SGM by down sampling the reference image and the cost volume.

5. The depth sensing system of claim 4, wherein the image processing application directs the processor to down sample the reference image and the cost volume to $1/16^{th}$ their original resolutions.

6. The depth sensing system of claim 3, wherein the image processing application directs the processor to obtain reliable depth estimates from the raw depth map by:
    determining depth based upon reliable depth estimates from the raw depth map when the confidence map indicates the depth estimate is highly reliable; and
    otherwise determining depth based upon the secondary depth estimates produced by performing SGM.

7. The depth sensing system of claim 1, wherein the image processing application directs the processor to determine depth values representative of a window of pixels by selecting a value within each of the window of pixels based upon weights that provide robustness to noise from underlying raw depth estimates.

8. The depth sensing system of claim 1, wherein the image processing application directs the processor to determine depth values representative of windows of pixels by determining median depth values for 17×17 windows of pixels.

9. The depth sensing system of claim 8, wherein the image processing application directs the processor to determine median depth values for 17×17 windows of pixels by determining a median value of a subset of a 17×17 window of pixels, where the subset does not include all of the pixels in the 17×17 window of pixels.

10. The depth sensing system of claim 9, wherein the subset is ¼ of the 289 pixels in the 17×17 window of pixels.

11. The depth sensing system of claim 1, wherein the edge guided filtering is with respect to the reference image.

12. The depth sensing system of claim 1, wherein the filter applied during the generation of the regularized depth map is configured to provide smoothness in disparity transitions.

13. The depth sensing system of claim 1, wherein the at least one alternate view image is a single alternate view image, and the reference image and the single alternate view image form a stereo pair.

14. The depth sensing system of claim 13, wherein the at least one camera comprises two cameras, and the stereo pair are captured simultaneously by the two cameras.

15. The depth sensing system of claim 1, wherein the image processing application directs the processor to identify depth estimates in the raw depth map that are unreliable by identifying flat regions within at least the reference image.

16. The depth sensing system of claim 1, wherein the image processing application further directs the processor to rectify the reference image and the at least one alternate view image.

17. The depth sensing system of claim 1, wherein:
    the display is a 3D display;
    the image processing application further directs the processor to:
        render a second image of the scene including the virtual object; and
        display in real time both the image of the scene and the second image of the scene via the 3D display.

18. The depth sensing system of claim 1, wherein the image of the scene including the virtual object is displayed as part of a video sequence having a frame rate of at least 25 frames/second.

19. A method for providing computer-generated Augment Reality (AR) video in real time via a display, comprising:
    obtaining image data for a plurality of images of a scene from multiple viewpoints using a mobile device, where:
        the image data for the plurality of images comprises a reference image and at least one alternate view image; and
        the mobile device comprises at least one camera, a processor, and a display;
    generating, using the processor, a raw depth map and a confidence map based upon observed parallax between the image data for the reference image and the image data for the at least one alternate view image, where:
        the raw depth map contains depth estimates for pixels within the reference image, and
        the confidence map indicates reliability of depth estimates contained within the raw depth map;
    identifying, using the processor, depth estimates in the raw depth map that are unreliable;
    ignoring the depth estimates in the raw depth map that are identified as unreliable to obtain, using the processor, reliable depth estimates from the raw depth map;
    generating, using the processor, a regularized depth map in real time by applying a filter to the reliable depth estimates from the raw depth map, where the filter:
        determines depth based upon reliable depth estimates from the raw depth map when the confidence map indicates the depth estimate is highly reliable; and determines depth based upon a bilateral weighted filter that provides edge guided filtering of the reliable depth estimates from the raw depth map when the confidence map indicates the depth estimate is unreliable, where the bilateral weighted filter:
  determines depth values representative of windows of pixels; and
  applies a bilateral filter to the determined depth values representative of windows of pixels, where weights of the bilateral filter are based upon pixel proximity and similarity of intensity;
inserting, using the processor, a virtual object into the scene based upon the regularized depth map;
rendering, using the processor, an image of the scene including the virtual object; and
displaying, in real time via the display, the image of the scene including the virtual object.

20. The method of claim 19, wherein generating the raw depth map comprises determining a cost volume, where the cost volume indicates matching costs for pixels in the reference image at different depth samples based upon the at least one alternate view image.

21. The method of claim 20, wherein obtaining reliable depth estimates from the raw depth map further comprises performing Semi Global Matching (SGM) using the reference image and the cost volume to produce secondary depth estimates.

22. The method of claim 21, wherein performing SGM comprises down sampling the reference image and the cost volume.

23. The method of claim 22, wherein the reference image and the cost volume are down sampled to $1/16^{th}$ their original resolutions.

24. The method of claim 21, wherein obtaining reliable depth estimates from the raw depth map further comprises:
  determining depth based upon reliable depth estimates from the raw depth map when the confidence map indicates the depth estimate is highly reliable; and
  otherwise determining depth based upon the secondary depth estimates produced by performing SGM.

25. The method of claim 19, wherein determining depth values representative of a window of pixels comprises selecting a value within each of the window of pixels based upon weights that provide robustness to noise from underlying raw depth estimates.

26. The method of claim 19, wherein determining depth values representative of windows of pixels comprises determining median depth values for 17×17 windows of pixels.

27. The method of claim 26, wherein determining median depth values for 17×17 windows of pixels comprises determining a median value of a subset of a 17×17 window of pixels, where the subset does not include all of the pixels in the 17×17 window of pixels.

28. The method of claim 27, wherein the subset is ¼ of the 289 pixels in the 17×17 window of pixels.

29. The method of claim 19, wherein the edge guided filtering is with respect to the reference image.

30. The method of claim 19, wherein the filter applied during the generation of the regularized depth map is configured to provide smoothness in disparity transitions.

31. The method of claim 19, wherein the at least one alternate view image is a single alternate view image, and the reference image and the single alternate view image form a stereo pair.

32. The method of claim 31, wherein the mobile device comprises two cameras, and the stereo pair are captured simultaneously by the two cameras.

33. The method of claim 19, wherein identifying depth estimates in the raw depth map that are unreliable comprises identifying flat regions within at least the reference image.

34. The method of claim 19, further comprising rectifying the reference image and the at least one alternate view image using the processor.

35. The method of claim 19, wherein:
  the mobile device is a headset;
  the display is a 3D display;
  the method further comprising:
    rendering a second image of the scene including the virtual object using the processor; and
    displaying in real time both the image of the scene and the second image of the scene via the 3D display.

36. The method of claim 19, wherein the image of the scene including the virtual object is displayed as part of a video sequence having a frame rate of at least 25 frames/second.

37. A method for providing computer-generated Augment Reality (AR) video in real time via a display, comprising:
  obtaining image data for a plurality of images of a scene from multiple viewpoints using a mobile device, where;
    the image data for the plurality of images comprises a reference image and an alternate view image; and
    the mobile device comprises at least one camera, a processor, and a display,
  rectifying the reference image and the alternate view image;
  generating, using the processor, a raw depth map and a confidence map based upon observed parallax between the rectified reference image and the rectified alternate view image, where:
    the raw depth map contains depth estimates for pixels within the reference image, and
    the confidence map indicates reliability of depth estimates contained within the raw depth map; and
  identifying, using the processor, depth estimates in the raw depth map that are unreliable;
  ignoring the depth estimates in the raw depth map that are identified as unreliable to obtain, using the processor, reliable depth estimates from the raw depth map;
  generating, using the processor, a regularized depth map in real time by applying a filter to the reliable depth estimates from the raw depth map, where the filter:
    determines depth based upon reliable depth estimates from the raw depth map when the confidence map indicates the depth estimate is highly reliable; and
    determines depth based upon a bilateral weighted filter that provides edge guided filtering of the reliable depth estimates from the raw depth map when the confidence map indicates the depth estimate is unreliable, where the bilateral weighted filter:
      determines depth values representative of windows of pixels; and
      applies a bilateral filter to the determined depth values representative of windows of pixels, where weights of the bilateral filter are based upon pixel proximity and similarity of intensity;
  inserting, using the processor, a virtual object into the scene based upon the regularized depth map;
  rendering, using the processor, an image of the scene including the virtual object; and
  displaying, in real time via the display, the image of the scene including the virtual object.

38. A method for providing computer-generated Augment Reality (AR) video in real time via a display, comprising:
repeatedly:
- obtaining image data for a plurality of images of a scene from multiple viewpoints using a mobile device, where:
  - the image data for the plurality of images comprises a reference image and an alternate view image; and
  - the mobile device comprises at least one camera, a processor, and a display;
- rectifying the reference image and the alternate view image;
- generating, using the processor, a raw depth map and a confidence map based upon observed parallax between the rectified reference image and the rectified alternate view image, where;
  - the raw depth map contains depth estimates for pixels within the reference image, and
  - the confidence map indicates reliability of depth estimates contained within the raw depth map; and
- identifying, using the processor, depth estimates in the raw depth map that are unreliable;
- ignoring the depth estimates in the raw depth map that are identified as unreliable to obtain, using the processor, reliable depth estimates from the raw depth map;
- generating, using the processor, a regularized depth map in real time by applying a filter to the reliable depth estimates from the raw depth map, where the filter:
  - determines depth based upon reliable depth estimates from the raw depth map when the confidence map indicates the depth estimate is highly reliable; and
  - determines depth based upon a bilateral weighted filter that provides edge guided filtering of the reliable depth estimates from the raw depth map when the confidence map indicates the depth estimate is unreliable, where the bilateral weighted filter:
    - determines depth values representative of windows of pixels; and
    - applies a bilateral filter to the determined depth values representative of windows of pixels, where weights of the bilateral filter are based upon pixel proximity and similarity of intensity;
- inserting, using the processor, a virtual object into the scene based upon the regularized depth map;
- rendering, using the processor, an image of the scene including the virtual object; and
- displaying, in real time via the display, the image of the scene including the virtual object;

wherein the repeated display in real time of images of the scene including the virtual object via the display provides images of the scene including the virtual object at a frame rate of at least 25 frames/second.

* * * * *